US012750815B2

(12) United States Patent
Sun et al.

(10) Patent No.: US 12,750,815 B2
(45) Date of Patent: Sep. 29, 2026

(54) COMMUNICATION METHOD AND APPARATUS

(71) Applicant: HUAWEI TECHNOLOGIES CO., LTD., Shenzhen (CN)

(72) Inventors: Yaqi Sun, Shenzhen (CN); Yiqun Wu, Boulogne Billancourt (FR); Yan Sun, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 238 days.

(21) Appl. No.: 18/776,184

(22) Filed: Jul. 17, 2024

(65) Prior Publication Data

US 2024/0373400 A1 Nov. 7, 2024

Related U.S. Application Data

(63) Continuation of application No. PCT/CN2023/077981, filed on Feb. 23, 2023.

(30) Foreign Application Priority Data

Feb. 25, 2022 (CN) ......................... 202210179627.2

(51) Int. Cl.
*H04W 64/00* (2009.01)
*H04L 25/02* (2006.01)

(52) U.S. Cl.
CPC ....... *H04W 64/006* (2013.01); *H04L 25/0204* (2013.01)

(58) Field of Classification Search
CPC ..... H04W 64/006; H04W 4/023; H04W 4/02; H04W 64/00; H04L 25/0204; H04L 25/02;
(Continued)

(56) References Cited

U.S. PATENT DOCUMENTS

2012/0170635 A1* 7/2012 Peroulas ............ H04L 25/0212 375/350
2021/0377901 A1 12/2021 Henry et al.
2023/0379860 A1* 11/2023 Rao .......................... G01S 5/01

OTHER PUBLICATIONS

3rd Generation Partnership Project; Technical Specification Group Radio Access Network; LTE Positioning Protocol (LPP)(Release 16). 3GPP TS 37.355 V16.7.0 (Dec. 2021). total 131 pages.

(Continued)

*Primary Examiner* — Fred A Casca

(57) ABSTRACT

This disclosure provides a communication method, which includes: obtaining M pieces of channel estimation information, where an $m^{th}$ piece of channel estimation information in the M pieces of channel estimation information is estimation information of a channel between an $m^{th}$ cell node in M cell nodes and a terminal device; determining a type of a target positioning manner based on the M pieces of channel estimation information; and obtaining N pieces of channel estimation information based on the type of the target positioning manner, where the N pieces of channel estimation information are used to position the terminal device, an $n^{th}$ piece of channel estimation information in the N pieces of channel estimation information is estimation information of a channel between an $n^{th}$ cell node in N cell nodes and the terminal device, the N cell nodes are included in the M cell nodes.

17 Claims, 13 Drawing Sheets

(58) Field of Classification Search
CPC ...... G01S 5/0036; G01S 5/011; G01S 5/0218; G01S 5/0244; G01S 5/0278
See application file for complete search history.

(56) References Cited

OTHER PUBLICATIONS

3rd Generation Partnership Project; Technical Specification Group Radio Access Network; NG Radio Access Network (NG-RAN); Stage 2 functional specification of User Equipment (UE) positioning in NG-RAN(Release 16). 3GPP TS 38.305 V16.7.0 (Dec. 2021). total 117 pages.

3rd Generation Partnership Project; Technical Specification Group Radio Access Network; NG-RAN; NR Positioning Protocol A (NRPPa)(Release 16). 3GPP TS 38.455 V16.6.0 (Dec. 2021). total 154 pages.

* cited by examiner

COMMUNICATION METHOD AND APPARATUS

CROSS-REFERENCE TO RELATED APPLICATIONS

This application is a continuation of International Application No. PCT/CN2023/077981, filed on Feb. 23, 2023, which claims priority to Chinese Patent Application No. 202210179627.2, filed on Feb. 25, 2022. The disclosures of the aforementioned applications are hereby incorporated by reference in their entireties.

TECHNICAL FIELD

This disclosure relates to the field of communication technologies, and in particular, to a communication method and apparatus.

BACKGROUND

In a wireless communication network, for example, in a mobile communication network, services supported by the network are increasingly diversified, and therefore requirements that need to be met are increasingly diversified. For example, the network needs to support an ultra-high rate, an ultra-low delay, and/or an ultra-large connection. The features increasingly complicate network planning, network configuration, and/or resource scheduling. In addition, because a network function is increasingly powerful, for example, supporting an increasingly high spectrum and supporting new technologies such as a high-order multiple-input multiple-output (multiple input multiple output, MIMO) technology, beamforming, and/or beam management, energy conservation of the network becomes a hot research topic. These new requirements, scenarios, and features bring unprecedented challenges to network planning, operation and maintenance, and efficient operation. To address this challenge, an artificial intelligence technology may be introduced into the wireless communication network, to implement network intelligence. Based on this, how to effectively implement artificial intelligence in a network is a problem worth studying.

SUMMARY

This disclosure provides a communication method and apparatus, to implement flexible positioning by using artificial intelligence and improve positioning accuracy.

According to a first aspect, this disclosure provides a communication method. The method may be performed by a positioning server, a processor in a positioning server, or the like. The positioning server may be a location management function (location management function, LMF) network element, or the like. The method includes: obtaining M pieces of channel estimation information, where an $m^{th}$ piece of channel estimation information in the M pieces of channel estimation information is estimation information of a channel between an $m^{th}$ cell node in M cell nodes and a terminal device, M is a positive integer, and m is a positive integer ranging from 1 to M; determining a type of a target positioning manner based on the M pieces of channel estimation information; and obtaining N pieces of channel estimation information based on the type of the target positioning manner, where the N pieces of channel estimation information are used to position the terminal device, an $n^{th}$ piece of channel estimation information in the N pieces of channel estimation information is estimation information of a channel between an $n^{th}$ cell node in N cell nodes and the terminal device, the N cell nodes are included in the M cell nodes, N is a positive integer less than or equal to M, and n is a positive integer ranging from 1 to N.

In the foregoing design, the target positioning manner is determined based on the estimation information of the cell node and the terminal device, and then the estimation information between the plurality of cell nodes and the terminal device is selected based on the target positioning manner to position the terminal device. This can match a communication environment in real time, flexibly switch a positioning manner, and help improve positioning accuracy.

In a possible design, the method further includes: obtaining a positioning requirement, where the positioning requirement is used to obtain the M pieces of channel estimation information for determining the type of the target positioning manner, the positioning requirement indicates a value condition that a positioning indicator needs to meet, and the M pieces of channel estimation information can be used to determine a value of the positioning indicator. This design can ensure that the selected target positioning manner meets the positioning requirement.

In a possible design, the method further includes: sending first request information, where the first request information is used to request the M pieces of channel estimation information, and the first request information includes information for indicating the positioning requirement or the positioning indicator. In this design, the device that provides the channel estimation information may learn of parameter types that should be indicated by the M pieces of channel estimation information. This helps improve efficiency of determining the target positioning manner.

In an optional design, the positioning indicator may include one or more of the following: a type of a communication path between the cell node and the terminal device, where the type of the communication path includes a line of sight or a non-line of sight; and positioning accuracy corresponding to at least one type of positioning manner.

In an optional design, when the type of the target positioning manner corresponds to a first value, the $n^{th}$ piece of second channel estimation information in the N pieces of channel estimation information indicates one or more of the following parameters: a distance between the $n^{th}$ cell node and the terminal device; a signal transmission delay or a signal transmission delay difference between the $n^{th}$ cell node and the terminal device; and a signal angle of departure or a signal angle of arrival corresponding to the $n^{th}$ cell node; or when the type of the target positioning manner corresponds to a second value, the $n^{th}$ piece of second channel estimation information in the N pieces of channel estimation information indicates channel information of the channel between the $n^{th}$ cell node and the terminal device.

In this design, the channel estimation information matching the type of the target positioning manner is obtained, to facilitate subsequent implementation of the target positioning manner.

In an optional design, the obtaining N pieces of channel estimation information based on the type of the target positioning manner includes: sending second request information, where the second request information is used to request the N pieces of channel estimation information, and the second request information includes information for indicating the type of the target positioning manner; and receiving the N pieces of channel estimation information. In this design, the device that provides the channel estimation information may learn of parameter types that should be indicated by the N pieces of channel estimation information. This helps improve efficiency of implementing the target positioning manner.

In an optional design, the method further includes: positioning the terminal device within a specified time period based on the N pieces of channel estimation information. Effective use duration of the target positioning manner is specified, so that the positioning manner is periodically adjusted to dynamically match the communication environment, and the terminal device is more flexibly positioned.

According to a second aspect, this disclosure provides a communication method. The method includes: sending M pieces of channel estimation information, where the M pieces of channel estimation information are used to determine a type of a target positioning manner, an $m^{th}$ piece of channel estimation information in the M pieces of channel estimation information is estimation information of a channel between an $m^{th}$ cell node in M cell nodes and a terminal device, M is a positive integer, and m is a positive integer ranging from 1 to M; obtaining second request information for requesting N pieces of channel estimation information, where the second request information includes information for indicating the type of the target positioning manner; and sending the N pieces of channel estimation information, where the N pieces of channel estimation information are used to position the terminal device, an $n^{th}$ piece of channel estimation information in the N pieces of channel estimation information is estimation information of a channel between an $n^{th}$ cell node in N cell nodes and the terminal device, the N cell nodes are included in the M cell nodes, N is a positive integer less than or equal to M, and n is a positive integer ranging from 1 to N.

In an optional design, the method further includes: obtaining first request information, where the first request information is used to request the M pieces of channel estimation information, the first request information includes information for indicating a positioning requirement or a positioning indicator, the positioning requirement indicates a value condition that the positioning indicator needs to meet, and the M pieces of channel estimation information can be used to determine a value of the positioning indicator.

In an optional design, the positioning indicator includes one or more of the following: a type of a communication path between the cell node and the terminal device, where the type of the communication path includes a line of sight or a non-line of sight; and positioning accuracy corresponding to at least one type of positioning manner.

In an optional design, when the type of the target positioning manner corresponds to a first value, an $n^{th}$ piece of channel estimation information in the N pieces of channel estimation information indicates one or more of the following parameters: a distance between the $n^{th}$ cell node and the terminal device; a signal transmission delay or a signal transmission delay difference between the $n^{th}$ cell node and the terminal device; and a signal angle of departure or a signal angle of arrival corresponding to the $n^{th}$ cell node.

In an optional design, when the type of the target positioning manner corresponds to a second value, an $n^{th}$ piece of channel estimation information in the N pieces of channel estimation information indicates channel information of the channel between the $n^{th}$ cell node and the terminal device.

According to a third aspect, this disclosure provides a communication apparatus. The communication apparatus may be a location management function (location management function, LMF) network element, referred to as an LMF for short, or may be an apparatus in an LMF, or an apparatus that can match an LMF for use. In a design, the communication apparatus may include modules that are in one-to-one correspondence with the method/operations/steps/actions described in the first aspect. The modules may be implemented by a hardware circuit, software, or a combination of a hardware circuit and software. In a design, the communication apparatus may include a processing module and a communication module.

An example is as follows.

The communication module is configured to obtain M pieces of channel estimation information, where an $m^{th}$ piece of channel estimation information in the M pieces of channel estimation information is estimation information of a channel between an $m^{th}$ cell node in M cell nodes and a terminal device, M is a positive integer, and m is a positive integer ranging from 1 to M.

The processing module is configured to determine a type of a target positioning manner based on the M pieces of channel estimation information.

The processing module is further configured to control the communication module to obtain N pieces of channel estimation information based on the type of the target positioning manner, where the N pieces of channel estimation information are used to position the terminal device, an $n^{th}$ piece of channel estimation information in the N pieces of channel estimation information is estimation information of a channel between an $n^{th}$ cell node in N cell nodes and the terminal device, the N cell nodes are included in the M cell nodes, N is a positive integer less than or equal to M, and n is a positive integer ranging from 1 to N.

In a possible design, the communication module is further configured to obtain a positioning requirement, where the positioning requirement is used to obtain the M pieces of channel estimation information for determining the type of the target positioning manner, the positioning requirement indicates a value condition that a positioning indicator needs to meet, and the M pieces of channel estimation information can be used to determine a value of the positioning indicator.

In a possible design, the communication module is further configured to send first request information, where the first request information is used to request the M pieces of channel estimation information, and the first request information includes information for indicating the positioning requirement or the positioning indicator.

In an optional design, the positioning indicator includes one or more of the following: a type of a communication path between the cell node and the terminal device, where the type of the communication path includes a line of sight or a non-line of sight; and positioning accuracy corresponding to at least one type of positioning manner.

In an optional design, when the type of the target positioning manner corresponds to a first value, the $n^{th}$ piece of second channel estimation information in the N pieces of channel estimation information indicates one or more of the following parameters: a distance between the $n^{th}$ cell node and the terminal device; a signal transmission delay or a signal transmission delay difference between the $n^{th}$ cell node and the terminal device; and a signal angle of departure or a signal angle of arrival corresponding to the $n^{th}$ cell node; or when the type of the target positioning manner corresponds to a second value, the $n^{th}$ piece of second channel estimation information in the N pieces of channel estimation information indicates channel information of the channel between the $n^{th}$ cell node and the terminal device.

In an optional design, the processing module is further configured to: send second request information by using the communication module, where the second request information is used to request the N pieces of channel estimation information, and the second request information includes information for indicating the type of the target positioning manner; and receive the N pieces of channel estimation information by using the communication module.

In an optional design, the processing module is further configured to position the terminal device within a specified time period based on the N pieces of channel estimation information.

According to a fourth aspect, this disclosure provides a communication apparatus. The communication apparatus may be a terminal device or a core network device, or may be an apparatus in a terminal device or a core network device, or an apparatus that can match a terminal device or a core network device for use. In a design, the communication apparatus may include modules that are in one-to-one correspondence with the method/operation/step/action described in the second aspect. The modules may be implemented by a hardware circuit, software, or a combination of a hardware circuit and software. In a design, the communication apparatus may include a processing module and a communication module.

An example is as follows.

The communication module is configured to send M pieces of channel estimation information, where the M pieces of channel estimation information are used to determine a type of a target positioning manner, an $m^{th}$ piece of channel estimation information in the M pieces of channel estimation information is estimation information of a channel between an $m^{th}$ cell node in M cell nodes and a terminal device, M is a positive integer, and m is a positive integer ranging from 1 to M.

The communication module is further configured to obtain second request information for requesting N pieces of channel estimation information, where the second request information includes information for indicating the type of the target positioning manner.

The processing module is configured to send the N pieces of channel estimation information by using the communication module, where the N pieces of channel estimation information are used to position the terminal device, an $n^{th}$ piece of channel estimation information in the N pieces of channel estimation information is estimation information of a channel between an $n^{th}$ cell node in N cell nodes and the terminal device, the N cell nodes are included in the M cell nodes, N is a positive integer less than or equal to M, and n is a positive integer ranging from 1 to N.

In an optional design, the communication module is further configured to obtain first request information, where the first request information is used to request the M pieces of channel estimation information, the first request information includes information for indicating a positioning requirement or a positioning indicator, the positioning requirement indicates a value condition that the positioning indicator needs to meet, and the M pieces of channel estimation information can be used to determine a value of the positioning indicator. The processing module is further configured to determine the M pieces of channel estimation information based on the first request information.

In an optional design, the positioning indicator includes one or more of the following: a type of a communication path between the cell node and the terminal device, where the type of the communication path includes a line of sight or a non-line of sight; and positioning accuracy corresponding to at least one type of positioning manner.

In an optional design, when the type of the target positioning manner corresponds to a first value, an $n^{th}$ piece of channel estimation information in the N pieces of channel estimation information indicates one or more of the following parameters: a distance between the $n^{th}$ cell node and the terminal device; a signal transmission delay or a signal transmission delay difference between the $n^{th}$ cell node and the terminal device; and a signal angle of departure or a signal angle of arrival corresponding to the $n^{th}$ cell node.

In an optional design, when the type of the target positioning manner corresponds to a second value, an $n^{th}$ piece of channel estimation information in the N pieces of channel estimation information indicates channel information of the channel between the $n^{th}$ cell node and the terminal device.

According to a fifth aspect, this disclosure provides a communication apparatus. The communication apparatus includes a processor, configured to implement the method described in the first aspect. The processor is coupled to a memory. The memory is configured to store instructions and data. When executing the instructions stored in the memory, the processor may implement the method described in the first aspect. Optionally, the communication apparatus may further include the memory. The communication apparatus may further include a communication interface. The communication interface is used by the apparatus to communicate with another device. For example, the communication interface may be a transceiver, a circuit, a bus, a module, a pin, or another type of communication interface.

In a possible design, the communication apparatus includes a processor, configured to: obtain M pieces of channel estimation information by using the communication interface, where an $m^{th}$ piece of channel estimation information in the M pieces of channel estimation information is estimation information of a channel between an $m^{th}$ cell node in M cell nodes and a terminal device, M is a positive integer, and m is a positive integer ranging from 1 to M; and determine a type of a target positioning manner based on the M pieces of channel estimation information; and obtain N pieces of channel estimation information based on the type of the target positioning manner, where the N pieces of channel estimation information are used to position the terminal device, an $n^{th}$ piece of channel estimation information in the N pieces of channel estimation information is estimation information of a channel between an $n^{th}$ cell node in N cell nodes and the terminal device, the N cell nodes are included in the M cell nodes, N is a positive integer less than or equal to M, and n is a positive integer ranging from 1 to N.

According to a sixth aspect, this disclosure provides a communication apparatus. The communication apparatus includes a processor, configured to implement the method described in the second aspect. The processor is coupled to a memory. The memory is configured to store instructions and data. When executing the instructions stored in the memory, the processor may implement the method described in the second aspect. Optionally, the communication apparatus may further include the memory. The communication apparatus may further include a communication interface. The communication interface is used by the apparatus to communicate with another device. For example, the communication interface may be a transceiver, a circuit, a bus, a module, a pin, or another type of communication interface.

In a possible device, the communication apparatus includes the processor, configured to: send M pieces of channel estimation information by using the communication interface, where the M pieces of channel estimation information are used to determine a type of a target positioning manner, an $m^{th}$ piece of channel estimation information in the M pieces of channel estimation information is estimation information of a channel between an $m^{th}$ cell node in M cell nodes and a terminal device, M is a positive integer, and m is a positive integer ranging from 1 to M; obtain, by using the communication interface, second request information for requesting N pieces of channel estimation information, where the second request information includes information for indicating the type of the target positioning manner; and send, by using the communication interface, the N pieces of channel estimation information, where the N pieces of channel estimation information are used to position the terminal device, an $n^{th}$ piece of channel estimation information in the N pieces of channel estimation information is estimation information of a channel between an $n^{th}$ cell node in N cell nodes and the terminal device, the N cell nodes are included in the M cell nodes, N is a positive integer less than or equal to M, and n is a positive integer ranging from 1 to N.

According to a seventh aspect, this disclosure provides a communication system, including the communication apparatus described in the third aspect or the fifth aspect, and the communication apparatus described in the fourth aspect or the sixth aspect.

According to an eighth aspect, this disclosure further provides a computer program. When the computer program is run on a computer, the computer is caused to perform the method provided in the first aspect or the second aspect.

According to a ninth aspect, this disclosure further provides a computer program product, including instructions. When the instructions are run on a computer, the computer is caused to perform the method provided in the first aspect or the second aspect.

According to a tenth aspect, this disclosure further provides a computer-readable storage medium. The computer-readable storage medium stores a computer program or instructions. When the computer program or the instructions are run on a computer, the computer is caused to perform the method provided in the first aspect or the second aspect.

According to an eleventh aspect, this disclosure further provides a chip. The chip is configured to read a computer program stored in a memory, to perform the method provided in the first aspect or the second aspect.

According to a twelfth aspect, this disclosure further provides a chip system. The chip system includes a processor, configured to support a computer apparatus in implementing the method provided in the first aspect or the second aspect. In a possible design, the chip system further includes a memory, and the memory is configured to store a program and data that are necessary for the computer apparatus. The chip system may include a chip, or may include a chip and another discrete component.

DESCRIPTION OF EMBODIMENTS

Figure 1A:
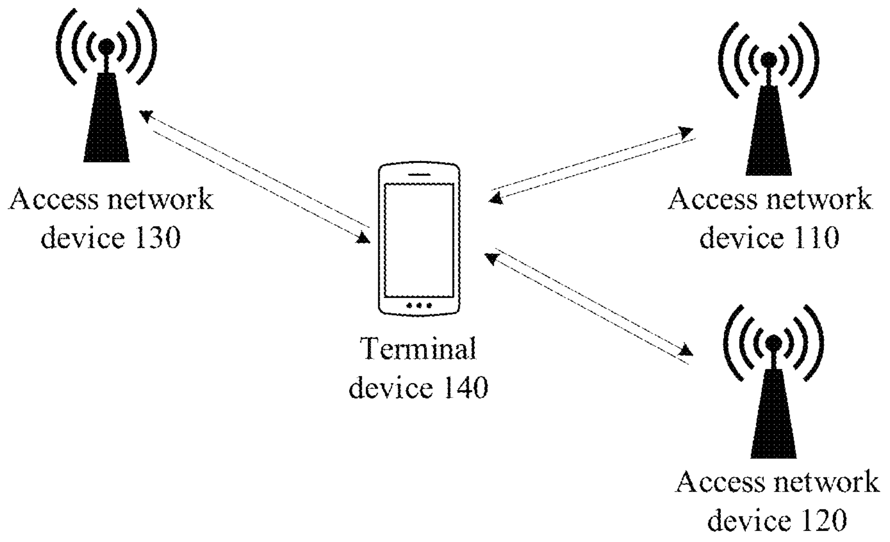
FIG. 1A is a diagram of a structure of a communication system according to this disclosure.

To make the objectives, technical solutions, and advantages of this disclosure clearer, the following further describes this disclosure in detail with reference to the accompanying drawings.

As described in the following in this disclosure, at least one (item) indicates one (item) or more (items). A plurality of (items) means two (items) or more than two (items). The term “and/or” describes an association relationship for describing associated objects and represents that three relationships may exist. For example, A and/or B may represent the following three cases: Only A exists, both A and B exist, and only B exists. The character “/” generally indicates an “or” relationship between the associated objects. In addition, it should be understood that although the terms such as first and second may be used in this disclosure to describe objects, these objects are not limited by these terms. These terms are merely used to distinguish the objects from each other.

The terms “including”, “having”, and any other variant thereof mentioned in the following descriptions of this disclosure are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. It should be noted that in this disclosure, the term such as “example” or “for example” represents giving an example, an illustration, or a description. Any method or design scheme described as an “example” or “for example” in this disclosure should not be explained as being more preferred or having more advantages than another method or design scheme. Exactly, use of the word “example”, “for example”, or the like is intended to present a related concept in a specific manner.

The technologies provided in this disclosure may be applied to various communication systems. For example, the communication system may be a $3^{rd}$ generation ($3^{rd}$ generation, 3G) communication system (for example, a universal mobile telecommunications system (universal mobile telecommunications system, UMTS)), a $4^{th}$ generation ($4^{th}$ generation, 4G) communication system (for example, a long term evolution (long term evolution, LTE) system), a $5^{th}$ generation ($5^{th}$ generation, 5G) communication system, a worldwide interoperability for microwave access (world-wide interoperability for microwave access, WiMAX) or wireless local area network (wireless local area network, WLAN) system, a converged system of a plurality of systems, or a future communication system, for example, a $6^{th}$ generation ($6^{th}$ generation, 6G) communication system. The 5G mobile communication system may also be referred to as a new radio (new radio, NR) system. A network element in the communication system may send a signal to another network element or receive a signal from another network element. The signal may include information, signaling, data, or the like. Alternatively, the network element may be replaced with an entity, a network entity, a device, a communication device, a communication module, a node, a communication node, or the like. In this disclosure, the network element is used as an example for description.

For example, the communication system may include at least one terminal device and at least one access network device. The access network device may send a downlink signal to the terminal device, and/or the terminal device may send an uplink signal to the access network device. In addition, it may be understood that if the communication system includes a plurality of terminal devices, the plurality of terminal devices may also send signals to each other. In other words, both a signal sending network element and a signal receiving network element may be terminal devices.

FIG. 1A shows a communication system 100. For example, the communication system 100 includes an access network device 110, an access network device 120, an access network device 130, and a terminal device 140. The terminal device 140 may send an uplink signal to one or more access network devices of the access network device 110, the access network device 120, and the access network device 130. The one or more access network devices of the access network device 110, the access network device 120, and the access network device 130 may send a downlink signal to the terminal device 140.

The following describes in detail the terminal device and the access network device in FIG. 1A.

(1) Access Network Device

The access network device may be a base station (base station, BS). The access network device may also be referred to as a network device, an access node (access node, AN), or a radio access node (radio access node, RAN). The base station may be in a plurality of forms, such as a macro base station, a micro base station, a relay station, or an access point. The access network device may be connected to a core network (for example, an LTE core network or a 5G core network). The access network device may provide a radio access service for the terminal device. For example, the access network device includes but is not limited to at least one of the following: a base station in 5G, for example, a transmission reception point (Transmission Reception Point, TRP) or a next generation nodeB (generation nodeB, gNB), an access network device in an open radio access network (open radio access network, O-RAN) or a module included in an access network device, an evolved nodeB (evolved nodeB, eNB), a radio network controller (radio network controller, RNC), a nodeB (nodeB, NB), a base station controller (base station controller, BSC), a base transceiver station (base transceiver station, BTS), a home base station (for example, a home evolved nodeB, or a home nodeB, HNB), a base band unit (base band unit, BBU), a transmitting and receiving point (transmitting and receiving point, TRP), a transmitting point (transmitting point, TP), a mobile switching center, and/or the like. Alternatively, the access network device may be a radio unit (radio unit, RU), a central unit (central unit, CU), a distributed unit (distributed unit, DU), a central unit control plane (CU control plane, CU-CP) node, or a central unit user plane (CU user plane, CU-UP) node. Alternatively, the access network device may be a vehicle-mounted device, a wearable device, an access network device in a future evolved public land mobile network (public land mobile network, PLMN), or the like.

In this disclosure, the communication apparatus configured to implement a function of the access network device may be an access network device, or may be a network device having some functions of the access network device, or may be an apparatus that can support the access network device in implementing the function, for example, a chip system, a hardware circuit, a software module, or a combination of a hardware circuit and a software module. The apparatus may be installed in the access network device or match the access network device for use. In the method disclosed in this disclosure, an example in which the communication apparatus configured to implement the function of the access network device is an access network device is used for description.

(2) Terminal Device

The terminal device is also referred to as a terminal, user equipment (user equipment, UE), a mobile station (mobile station, MS), a mobile terminal (mobile terminal, MT), or the like. The terminal device is a device that provides voice and/or data connectivity for a user. The terminal device may communicate with one or more core networks by using an access network device. The terminal device may be deployed on land, including an indoor device, an outdoor device, a handheld device, and/or a vehicle-mounted device, may be deployed on a water surface (for example, on a ship), or may be deployed in air (for example, on an airplane, a balloon, or a satellite). The terminal device includes a handheld device with a wireless connection function, another processing device connected to a wireless modem, a vehicle-mounted device, or the like. The terminal device may be a portable, pocket-sized, handheld, computer built-in, or vehicle-mounted mobile apparatus. For example, the terminal device is a personal communication service (personal communication service, PCS) phone, a cordless phone, a session initiation protocol (session initiation protocol, SIP) phone, a wireless local loop (wireless local loop, WLL) station, a personal digital assistant (personal digital assistant, PDA), a wireless network camera, a mobile phone (mobile phone), a tablet computer, a notebook computer, a palmtop computer, a mobile internet device (mobile internet device, MID), a wearable device like a smartwatch, a virtual reality (virtual reality, VR) device, an augmented reality (augmented reality, AR) device, a wireless terminal in industrial control (industrial control), a terminal in an internet of vehicles system, a wireless terminal in self driving (self driving), a wireless terminal in a smart grid (smart grid), a wireless terminal in transportation safety (transportation safety), a wireless terminal in a smart city (smart city) like a smart fueler, a terminal device on high-speed railways, a wireless terminal in a smart home (smart home) like a smart speaker, a smart coffee machine, or a smart printer, or the like.

In this disclosure, the communication apparatus configured to implement a function of the terminal device may be a terminal device, or may be a terminal device having some functions of the terminal, or may be an apparatus that can support the terminal device in implementing the function, for example, a chip system. The apparatus may be installed in the terminal device or match the terminal device for use. In this disclosure, the chip system may include a chip, or may include a chip and another discrete component. In the technical solutions provided in this disclosure, an example in which the communication apparatus configured to implement the function of the terminal device is a terminal device or UE is used for description.

It should be understood that a quantity and types of devices in the communication system shown in FIG. 1A are merely used as an example, and this disclosure is not limited thereto. During actual application, the communication system may further include more terminal devices and more access network devices, and may further include another network element, for example, may include a core network element and/or a network element configured to implement an artificial intelligence function.

Figure 1B:
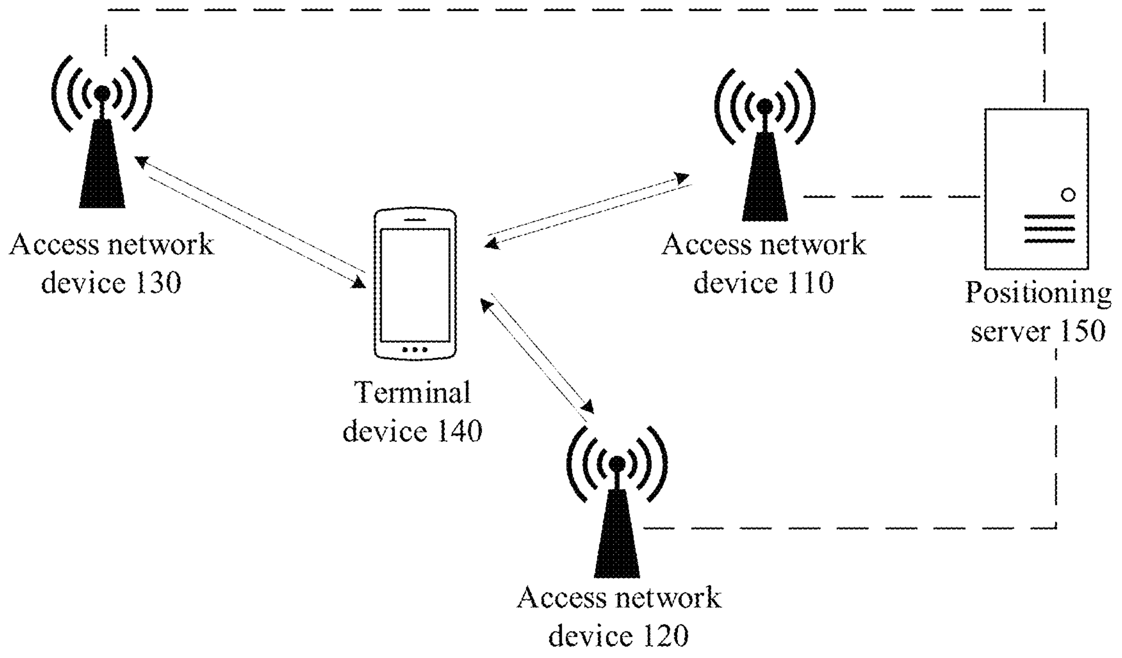
FIG. 1B is a diagram of a structure of a communication system according to this disclosure.

The method provided in this disclosure uses a technology for positioning a terminal device. As shown in FIG. 1B, a positioning server 150 is introduced into the communication system shown in FIG. 1A, and the positioning server 150 is configured to estimate a location of the terminal device.

Figure 1C:
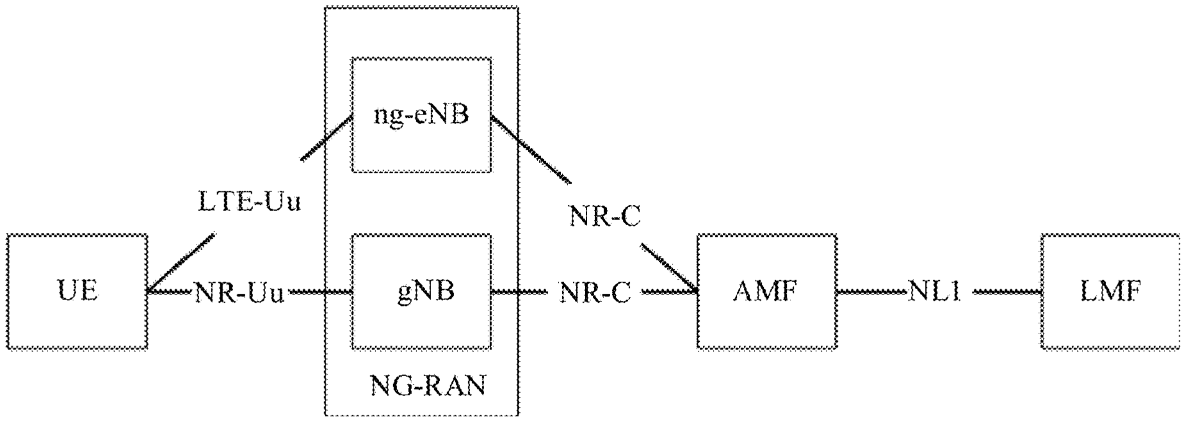
FIG. 1C is a diagram of a structure of a communication system according to this disclosure.

Specifically, the positioning server 150 in FIG. 1B may be implemented by an LMF network element. Refer to a communication system shown in FIG. 1C. In addition to an access network device and a terminal device, the communication system further includes a core network element, for example, an access and mobility management function (access and mobility management function, AMF) network element and a location management function (location management function, LMF) network element. In the communication system shown in FIG. 1C, the access network device may be a base station in a same standard, or may be base stations in different network standards. For example, FIG. 1C shows a 5G base station like a gNB, and a 4G base station like an ng-eNB that can access a 5G core network. The terminal device (represented by UE in FIG. 1C) and the gNB may communicate with each other via an NR-Uu interface, for example, transmit positioning-related signaling via the NR-Uu interface. The terminal device and the ng-eNB communicate with each other via an LTE-Uu interface, for example, transmit positioning-related signaling via the LTE-Uu interface. The gNB and the AMF communicate with each other via an NG-C interface, and the ng-eNB and the AMF communicate with each other via the NG-C interface. For example, the NG-C interface may be used to transmit positioning-related signaling. The AMF and the LMF communicate with each other via an NL1 interface, for example, transmit positioning-related signaling via the NL1 interface.

In a manner of positioning the terminal device, the positioning server may detect a feature parameter between the terminal device and the access network device at a specific location (namely, a known location), to obtain relative location or angle information between the terminal device and the access network device, to estimate a location of the terminal device. For example, the feature parameter includes a signal quality, a distance, a signal transmission delay (or referred to as a transmission period) or a delay difference, a signal angle of departure, a signal angle of arrival, and the like. The signal quality may be reflected by a signal-to-noise ratio, signal strength, signal field strength, signal energy, signal received power, and the like.

Specifically, either of the terminal device or the access network device sends a reference signal. The other measures the reference signal to obtain channel information, and may determine a feature parameter between the terminal device and the access network device based on the channel information, where the feature parameter may also be referred to as a measurement object; and the other further reports the measurement object to the LMF. For example, in a downlink positioning scenario, the access network device or a cell of the access network device sends a positioning reference signal (positioning reference signal, PRS) to the terminal device. The terminal device measures the PRS to obtain downlink channel information. Then, the terminal device determines the measurement object based on the downlink channel information, and reports the measurement object to the LMF for positioning the terminal device. For example, in an uplink positioning scenario, the terminal device may send a sounding reference signal (sounding reference signal, SRS) to the access network device or the cell of the access network device. The access network device or the cell of the access network device measures the SRS to obtain uplink channel information. Then, the access network device or the cell of the access network device determines the measurement object based on the uplink channel information, and reports the measurement object to the LMF for positioning the terminal device. The following describes some fault positioning methods.

Figure 2:
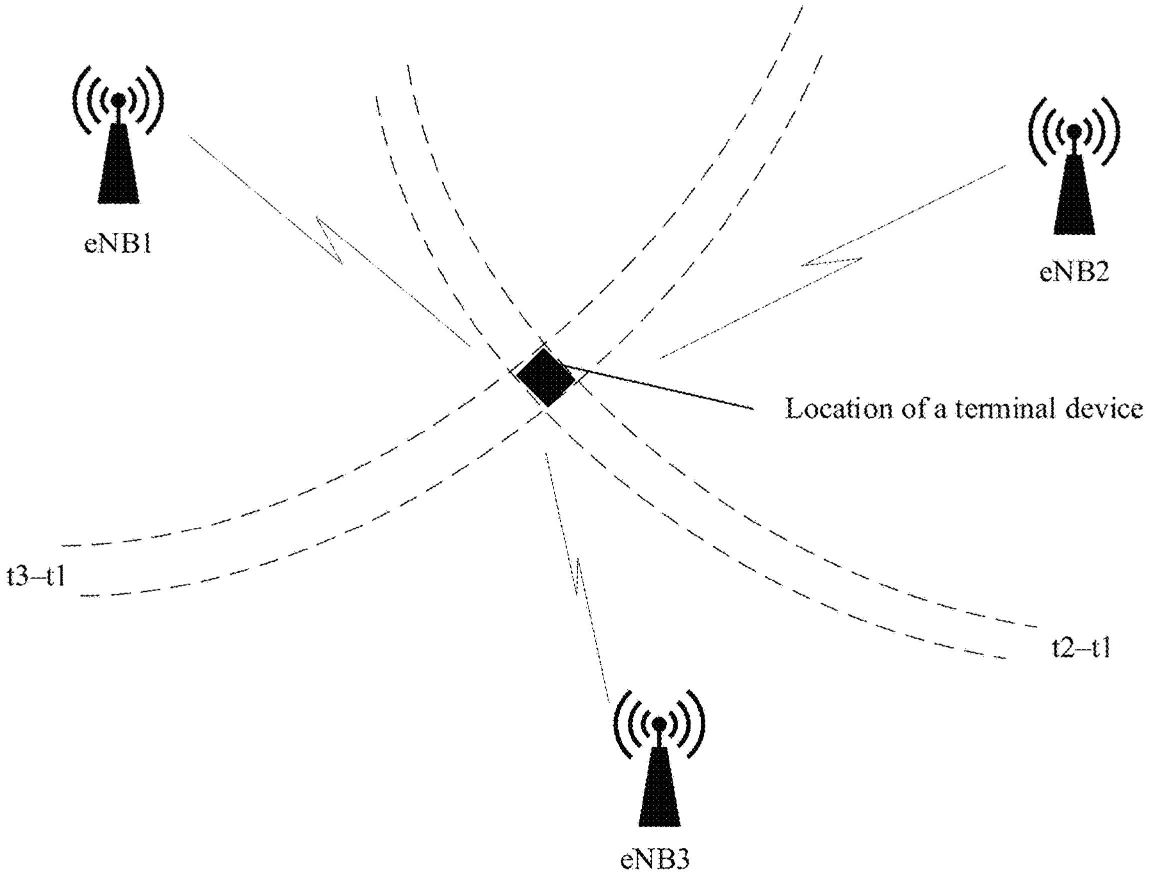
FIG. 2 is a principle diagram of a positioning method based on a TDOA.

In a positioning method based on a time difference of arrival (time difference of arrival, TDOA), a terminal device may be positioned by using synchronized locations of at least three access network devices. As shown in FIG. 2, three access network devices are marked as an eNB1, an eNB2, and an eNB3 respectively, distances between the three access network devices and the terminal device are d1, d2, and d3 respectively, and transmission periods of corresponding signals are t1, t2, and t3 respectively. For example, the three access network devices separately send, to the terminal device, PRSs that are denoted as P1, P2, and P3 respectively. The eNB1 may be set as a reference node, and the terminal device may measure a time difference of arrival between P2 and P1, that is, $t_2-t_1$, which is also referred to as a reference signal time difference (reference signal time difference, RSTD). The terminal device may infer $d_2-d_1$ by using $t_2-t_1$, and obtain a curve, so that a difference between distances from each point on the curve to the eNB2 and the eNB1 is $d_2-d_1$. Similarly, the terminal device may measure a time difference of arrival between P3 and P1, that is, $t_3-t_1$, and may infer $d_3-d_1$ by using $t_3-t_1$, and obtain another curve, so that a difference between distances from each point on the curve to the eNB3 and the eNB1 is $d_3-d_1$. The terminal device may determine a location of the terminal device by using an intersection point of the two curves. Alternatively, the terminal device may report at least one parameter of a signal transmission period, a time difference of arrival, a distance, or an inferred distance difference between different access network devices and the terminal device to the LMF. In this case, the LMF may determine the foregoing two curves and an intersection point of the two curves, to determine a location of the terminal device. In addition, because there is a specific synchronization error between different access network devices, a correspondingly obtained time difference of arrival may be represented as an interval range. For example, intervals in which the curves are located are represented by dashed lines shown in FIG. 2, and the location of the terminal device is located in an overlapping part (in black) between the intervals in which the two curves are located.

Specifically, the location of the terminal device may be calculated by using the following formula:

$$\begin{cases} \sqrt{(x_2-x)^2+(y_2-y)^2} - \sqrt{(x_1-x)^2+(y_1-y)^2} = d_2 - d_1 = c(t_2-t_1) \\ \sqrt{(x_3-x)^2+(y_3-y)^2} - \sqrt{(x_1-x)^2+(y_1-y)^2} = d_3 - d_1 = c(t_3-t_1) \end{cases}$$

$(x_i, y_i)$ represents location coordinates of an eNBi, and a value of i is 1, 2, or 3. (x, y) represents to-be-obtained location coordinates of the terminal device, and c represents a speed of light.

In the positioning method based on the TDOA described above, positioning is performed based on the PRS sent by the access network device to the terminal device. This positioning method may also be referred to as DL-TDOA or OTDOA. Similarly, if the positioning method based on the TDOA is a method for performing positioning based on an SRS sent by a terminal device to an access network device, this positioning method may also be referred to as UL-TDOA.

In a positioning method based on a signal angle of arrival (angle of arrival, AoA) or a signal angle of departure (angle of departure, AoD), a terminal device may be positioned by using synchronized locations of at least two access network devices. The signal herein is a signal transmitted between the access network device and the terminal device, and both the AoA and the AoD are angles relative to the access network device. To be specific, in a scenario in which positioning is performed based on the PRS sent by the access network device to the terminal device, the at least two access network devices may send PRSs to the terminal device, and the terminal device measures the PRSs sent by the different access network devices to determine an AoD corresponding to each access network device or determine an angle difference between an AoD corresponding to each access network device and an AoD reference value. Optionally, the AoD reference value may be an AoD corresponding to one of the at least two access network devices, or a preset AoD. The terminal device reports, to the LMF, the AoDs or the angle differences corresponding to the at least two access network devices, and the LMF may determine the location of the terminal device based on the AoDs or the angle differences corresponding to the at least two access network devices. In a scenario in which positioning is performed based on the SRS sent by the terminal device to the access network device, the terminal device may send the SRS to the at least two access network devices, and the different access network devices measure the SRS from the terminal device to determine an AoA corresponding to each access network device or determine an angle difference between an AoA corresponding to each access network device and an AoA reference value. Optionally, the AoA reference value may be an AoA corresponding to one of the at least two access network devices, or a preset AoA. Each access network device reports, to the LMF, the AoA or the angle difference corresponding to the access network device, and the LMF may determine the location of the terminal device based on the AoAs or the angle differences corresponding to the at least two access network devices.

When the foregoing positioning method is implemented, the LMF may exchange positioning configuration information with the terminal device or the access network device in advance, to determine the to-be-positioned terminal device, the access network device participating in positioning the terminal device, the positioning method to be used, downlink positioning (namely, positioning based on the PRS), uplink positioning (positioning based on the SRS), the measurement object, and another configuration. The following uses the DL-TDOA method as an example to describe a positioning procedure based on the LTE positioning protocol (LTE positioning protocol, LPP) in the 5G system. The LPP specifies a procedure in which the terminal device exchanges information with the LMF, that is, the terminal device may exchange information with the LMF by using an LPP message. It should be noted that the terminal device, the access network device, the AMF, and the LMF are connected in a manner of terminal device-access network device-AMF-LMF, and the LPP message is transparently transmitted across the access network device and the AMF, to implement interaction between the terminal device and the LMF.

First, the terminal device exchanges the positioning configuration information with the LMF. The positioning configuration information includes a positioning capability and positioning assistance information. This process may be triggered by the LMF or the terminal device. For example, when the LMF triggers transmission of the positioning assistance information, the LMF determines the positioning assistance information required by the terminal device, and sends an LPP provide assistance data (LPP Provide Assistance Data) message to the terminal device. For another example, when the terminal device triggers transmission of the positioning assistance information, the terminal device first determines the required positioning assistance information, and sends an LPP request assistance data (LPP Request Assistance Data) message to the LMF. The LPP request assistance data message may indicate the positioning assistance information required by the terminal device. The LMF sends the LPP provide assistance data message to the terminal device, to provide the positioning assistance information required by the terminal device. The positioning capability indicates information such as a positioning method supported by the terminal device, a protocol and procedure used, and a configurable parameter. The positioning assistance information includes one or more of the following parameters: an ID of a physical cell in which the terminal device is located, a global cell ID, an ID of the access network device, a PRS configuration of the access network device, synchronization signal block (synchronization signal/physical broadcast channel block, SSB) information of the access network device, spatial direction information of the PRS, geographical location coordinates of the access network device, a time difference between the access network device and the reference node, and other information.

Second, the terminal device exchanges location information with the LMF, that is, the terminal device measures the measurement object (or referred to as a positioning measurement result) determined based on the PRS sent by each access network device and feeds back the measurement object to the LMF. This process may be triggered by the terminal device or the LMF. For example, when the LMF triggers exchange of the location information, the LMF sends an LPP request location information (LPP Request Location Information) message to the terminal device. The LPP request location information message indicates information such as a positioning measurement result, measurement configuration information, and required response time that are required by the LMF. Then, the terminal device sends the LPP provide location information (LPP Provide Location Information) message to the LMF before the required response time, to feed back the measurement object. When the terminal device triggers exchange of the location information, the terminal device sends the LPP provide location information message to the LMF, to feed back the measurement object. The measurement object may include information such as an arrival time stamp of the PRS, a transmission period of the PRS, an arrival time difference corresponding to the PRS, and received signal power of the PRS. In addition, the measurement object may further include information for identifying the access network device, for example, include physical cell IDs, global cell IDs, and access network device IDs corresponding to different measurement objects.

In addition to the positioning assistance information and the location information that need to be exchanged between the terminal device and the LMF, some positioning assistance information also needs to be exchanged between the access network device and the LMF. Generally, the LMF triggers exchange of the positioning assistance information between the access network device and the LMF. A related procedure is specified in the NR positioning protocol A (NR positioning protocol A, NRPPa). The access network device is connected to the LMF through the AMF. The NRPPa is transparent to the AMF. Transparent transmission of NRPPa data units across AMFs enables the access network device to interact with the LMF. The positioning assistance information of the access network device includes a physical cell ID, a global cell ID, an ID of the access network device, a PRS configuration of the access network device, SSB information of the access network device, spatial direction information of the PRS, geographical location coordinates of the access network device, and the like. The LMF sends a TRP information request (TRP Information Request) message to the access network device, where the TRP information request message is used to request the positioning assistance information that is of the access network device and that is required by the LMF. The access network device sends a TRP information response (TRP Information Response) message to the LMF, where the TRP information response message indicates the positioning assistance information that is of the determined required access network device and that is required by the LMF. Alternatively, the access network device sends a TRP information failure (TRP Information Failure) message to the LMF, where the TRP information failure message indicates a failure cause.

Figure 3:
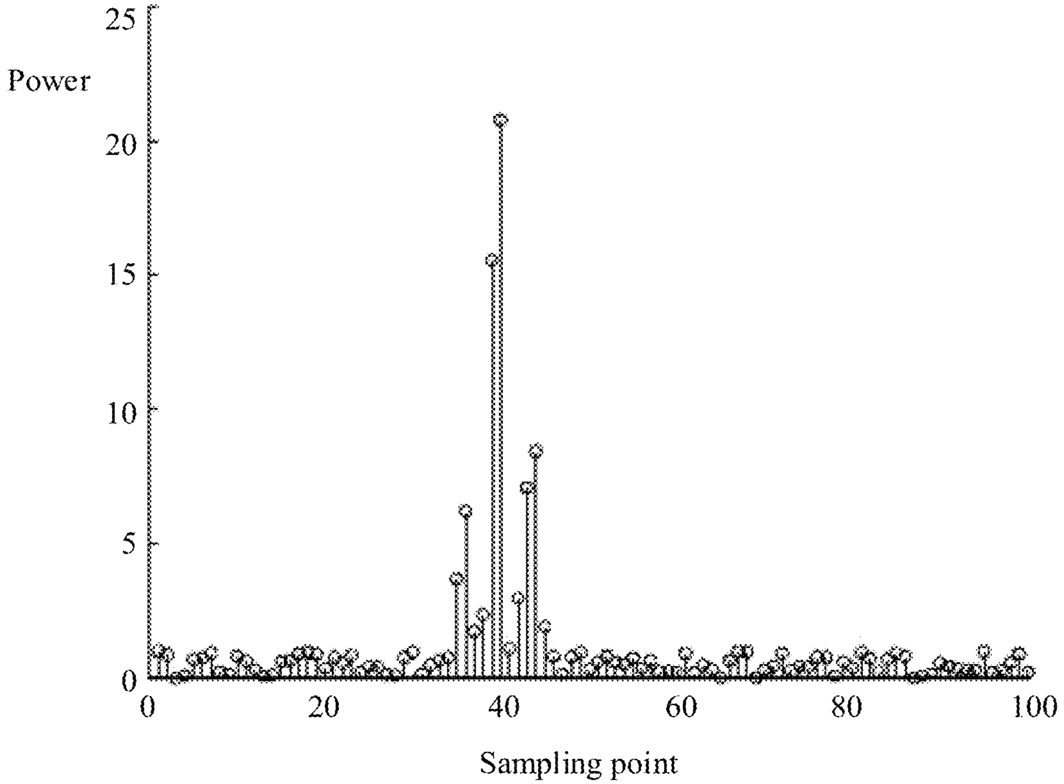
FIG. 3 is a diagram of a time domain channel response.
Figure 4:
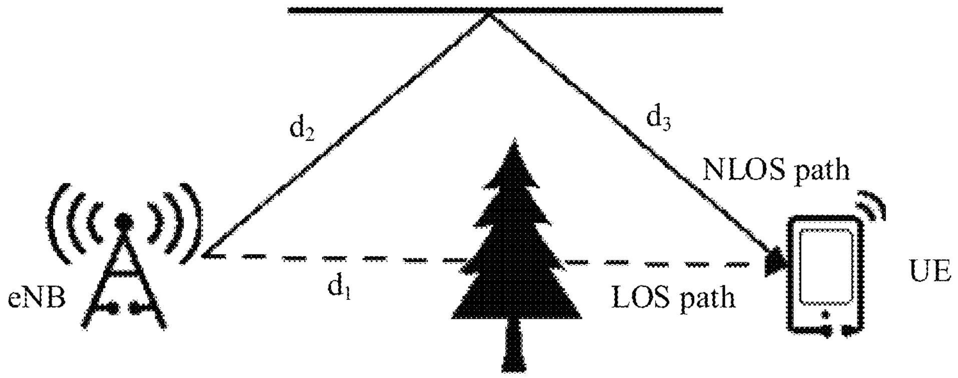
FIG. 4 is a diagram of a structure of a signal transmission path.

In an actual scenario, due to impact of noise and interference, a signal transmission period or a related angle determined by measuring the reference signal may have a specific measurement error, and a corresponding positioning result may also have a specific error. For example, FIG. 3 shows power $|h(t)|^2$ of a time domain channel response obtained by measuring a reference signal at different time domain sampling points. Signal power at time domain sampling points at the start is weak, and corresponds to a noise signal. Signal power of time domain sampling points in the middle is strong, and corresponds to a multipath response of an actual signal. That is, in the actual scenario, a start position of the actual signal needs to be determined in an environment in which interference and noise exist, to obtain the accurate signal transmission period or the accurate related angle. Determining the start position of the actual signal is also referred to as a first path identification problem. In addition, the reference signal is classified into a signal transmitted over a non-line of sight path (non-line of sight, NLOS) or a signal transmitted over a line of sight path (line of sight, LOS). NLOS between the access network device and the terminal device means that an obstacle exists between the access network and the terminal device, causing a signal to be transmitted in non-line of sight. LOS between the access network device and the terminal device means that a signal between the access network and the terminal device is transmitted in the line of sight. For example, as shown in FIG. 4, the LOS path (a dashed line) between the access network device and the terminal device is blocked by a tree, and actually the signal travels in NLOS (a solid line) with reflection by a wall. A distance of the NLOS path is greater than a distance of the LOS path. When the terminal device is positioned, if NLOS is mistakenly considered as LOS, measuring the reference signal based on NLOS causes a large estimation error to positioning of the terminal device.

Figure 5A:
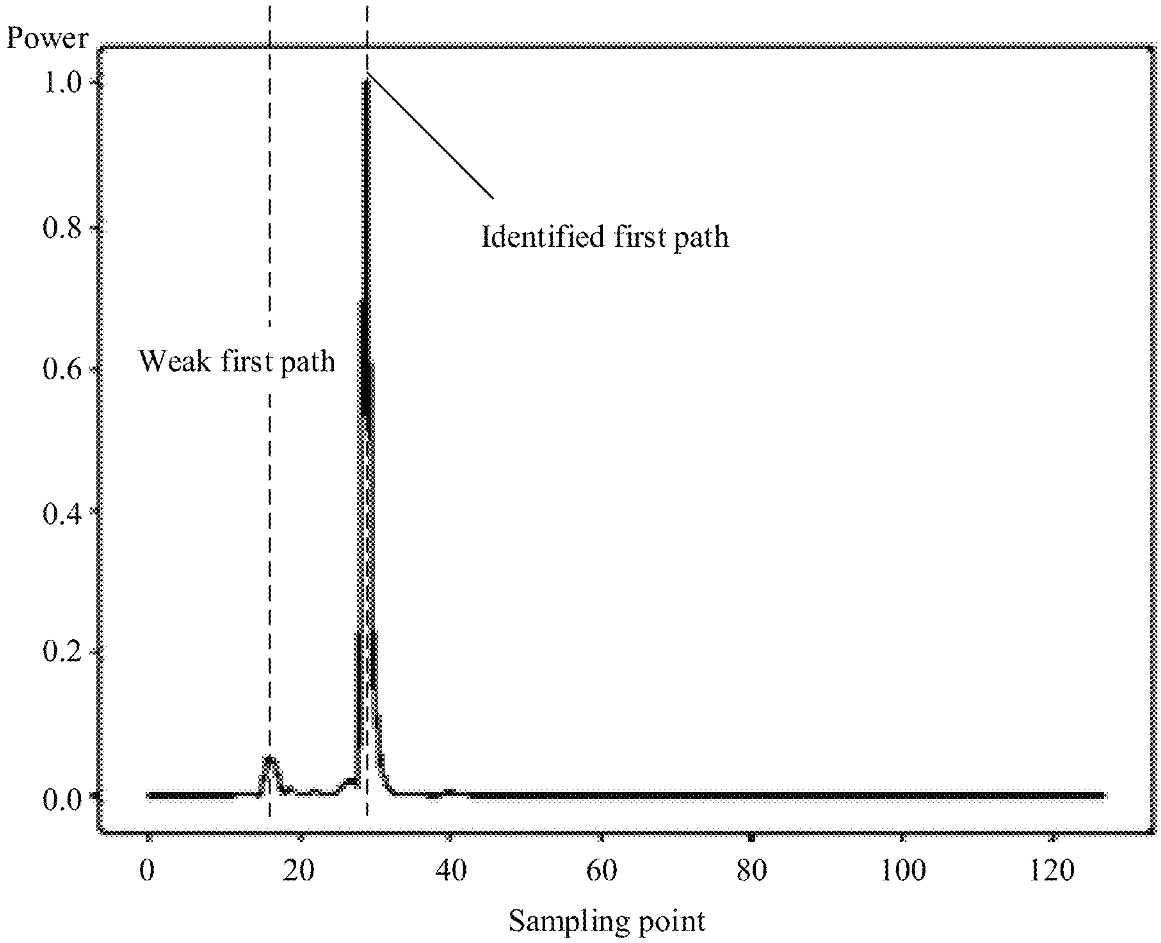
FIG. 5A is a diagram of a weak first path scenario.
Figure 5B:
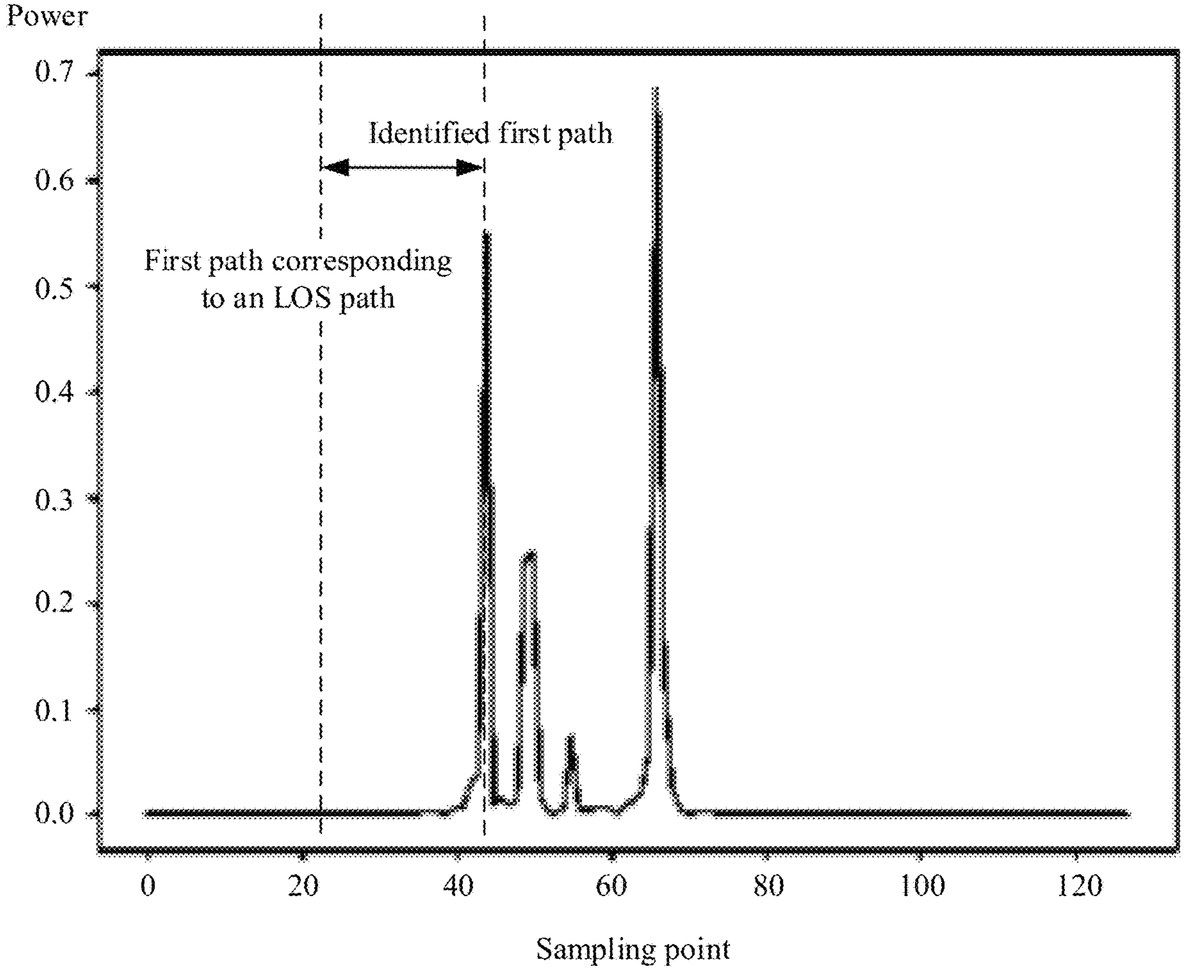
FIG. 5B is a diagram of an NLOS path scenario.

For example, in a weak first path scenario shown in FIG. 5A, because strength of a first path is weaker than strength of a subsequent delay path, the first path is referred to as a weak first path. In a conventional identification method, an actual weak first path is considered as noise, and a path after the weak first path is identified as a first path. As a result, a first path identification error is large, and positioning accuracy is reduced. In still another NLOS path scenario shown in FIG. 5B, an identified reference signal is transmitted over the NLOS path, that is, arrives through reflection, and travels a distance longer than a straight-line distance corresponding to the LOS path between the terminal device and the access network device. As a result, there is a large difference between an identified first path and a first path corresponding to the LOS path. As shown in FIG. 5B, a location of the first path corresponding to the LOS path in a delay domain is earlier than a location of the identified first path in the delay domain. It may be learned that in a manner of positioning the terminal device by using the measurement object, an error of first path estimation performed in the foregoing weak first path or NLOS path scenario is quite large. As a result, an error of an estimated location of the terminal device is also quite large.

In another manner of positioning the terminal device, the positioning server may obtain channel information of a channel between the terminal device and the access network device at the specific location (namely, the known location), and analyze the obtained channel information by using an AI technology, to estimate the location of the terminal device. Specifically, one of the terminal device or the access network device sends the reference signal. The other measures the reference signal to obtain channel information, and further reports the channel information to the LMF. The channel information may be a channel response obtained by the terminal device or the access network device by measuring the reference signal, or may be a feature based on a channel response. Optionally, the feature based on the channel response may be a channel response that undergoes several transformations such as normalization and truncation; the feature based on the channel response may be an artificial empirical feature, for example, a variance or an average value extracted from the channel response; or the feature based on the channel response may be a feature extracted by the terminal device or the access network device from the obtained channel response by using the AI technology.

Figure 6:
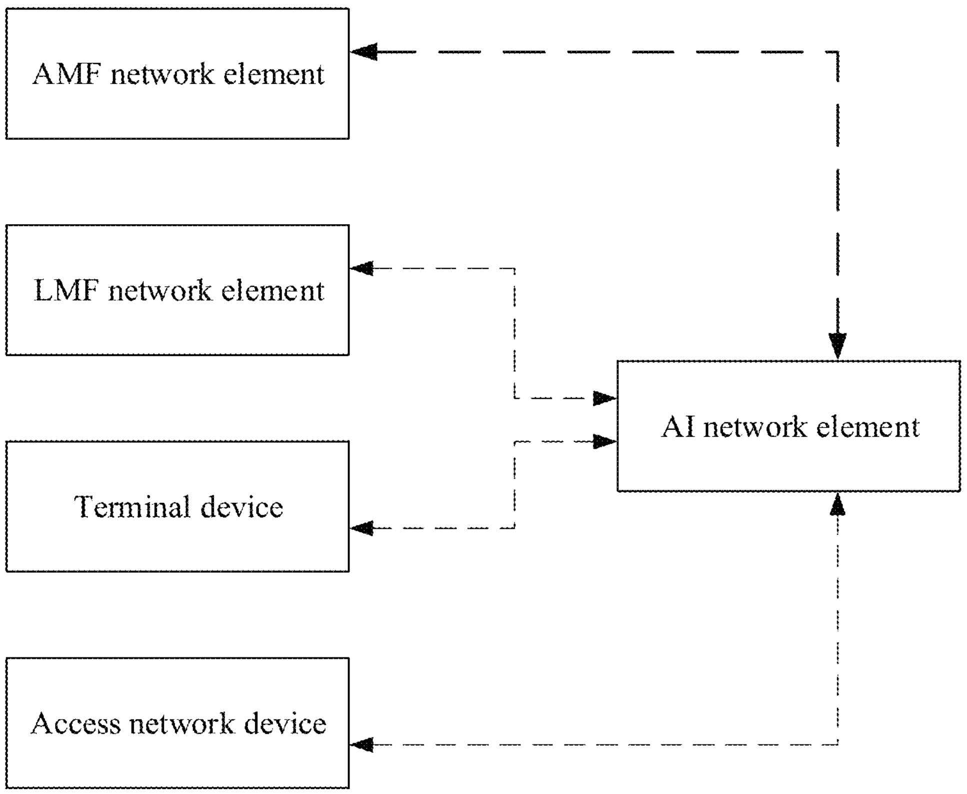
FIG. 6 is a diagram of a structure of a communication system according to this disclosure.

AI may be implemented by using various possible technologies, for example, implemented by using a machine learning (machine learning, ML) technology. In this disclosure, the communication system may further include a network element implementing an AI function. For example, the AI function (for example, an AI module or an AI entity) may be configured in an existing network element in the communication system to implement an AI-related operation. For example, in a 5G new radio (new radio, NR) system, the existing network element may be an access network device (such as a gNB), a terminal device, a core network device, a network management system, or the like. Alternatively, an independent network element may be introduced into the communication system to perform an AI-related operation. The independent network element may be referred to as an AI network element, an AI node, or the like. This name is not limited in this disclosure. In this case, a network element that performs an AI-related operation is a network element with a built-in AI function (for example, an AI module or an AI entity). The AI-related operation may also be referred to as the AI function. For details about the AI function, refer to the following descriptions. The AI network element may establish a communication connection to the network element included in the foregoing communication system, for example, a terminal device, an access network device, or a core network element. For example, as shown in FIG. 6, a communication system includes a terminal device, an access network device, an AMF network element, and an LMF network element. An introduced AI network element may establish communication connections to the terminal device, the access network device, the AMF network element, and the LMF network element.

For ease of understanding, the following first describes some terms of AI in this disclosure with reference to A1 to A4. It may be understood that the descriptions are not intended to limit this disclosure.

A1. AI Model

An AI model is a specific implementation of an A1 function. The AI model represents a mapping relationship between an input and an output of the model, and may be a function model that maps an input of a dimension to an output of a dimension. The AI model may be a neural network or another machine learning model, for example, a decision tree or a support vector machine. In this disclosure, the AI model may be briefly referred to as a model. In this disclosure, the AI function may include at least one of the following: data collection (collecting training data and/or inference data), data preprocessing, model training (or referred to as model learning), model information release (configuring model information), model inference, or inference result release. The inference may also be referred to as prediction. In this disclosure, the AI model may be briefly referred to as a model.

A2. Machine Learning

Machine learning is an important technical approach to implementing artificial intelligence. For example, machine learning can learn models or rules from raw data. Machine learning is classified into supervised learning, unsupervised learning, and reinforcement learning.

In terms of supervised learning, based on collected samples (or referred to as sample values) and sample labels, a mapping relationship between the samples and the sample labels is learned by using a machine learning algorithm, and the learned mapping relationship is expressed by using a machine learning model. A process of training a machine learning model is a process of learning the mapping relationship. For example, in signal detection, a sample is a received signal including noise, a sample label is a real constellation point corresponding to the received signal, and machine learning expects to learn a mapping relationship between a sample and a sample label through training. During training, an error between an output (namely, a predicted value) of the model and the sample label is calculated to optimize model parameters. Once the mapping relationship is learned, a sample label of each new sample can be predicted by using the learned mapping relationship. The mapping relationship learned through supervised learning may include linear mapping and non-linear mapping. A machine learning task may be classified into a classification task and a regression task based on a type of a sample label.

In terms of unsupervised learning, an internal pattern of a sample is autonomously explored by using an algorithm based on only a collected sample. In unsupervised learning, a type of algorithm (for example, an autoencoder or a generative adversarial network) can use a sample as a supervised signal. A model learns a mapping relationship from a sample to a sample. During training, an error between a predicted value of the model and the sample is calculated to optimize model parameters, to implement self-supervised learning. Self-supervised learning can be used in signal compression and decompression recovery application scenarios.

Reinforcement learning is an algorithm that interacts with an environment to learn a problem-resolving policy. Different from supervised learning and unsupervised learning, reinforcement learning does not have a specific sample label. The algorithm needs to interact with the environment to obtain a reward signal fed back by the environment, and then adjust a decision action to obtain a larger reward signal value. For example, in downlink power control, a reinforcement learning model adjusts downlink transmit power of each terminal based on a total system throughput fed back by a wireless network, to expect to obtain a higher system throughput. The goal of reinforcement learning is also to learn a mapping relationship between an environment status and an optimal decision action. Reinforcement learning training is implemented through iterative interaction with the environment.

A3. Neural Network

A neural network is a specific implementation form of an AI or machine learning technology. According to a universal approximation theorem, the neural network can theoretically approximate to any continuous function, so that the neural network can learn any mapping. In a conventional communication system, rich expertise is required to design a communication module. However, in a neural network-based deep learning communication system, an implicit pattern structure may be automatically discovered from a large quantity of data sets and a mapping relationship between data may be established, to obtain performance better than that of a conventional modeling method.

Figure 7A:
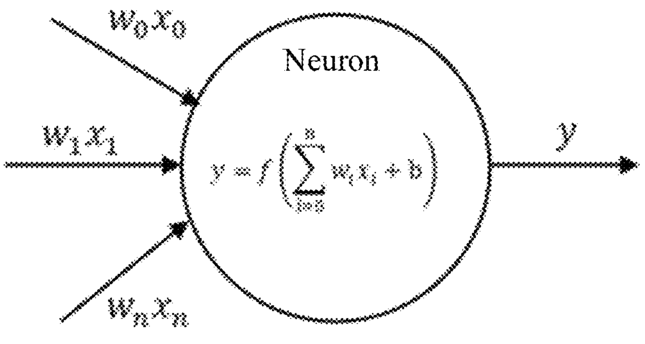
FIG. 7A is a diagram of a neuron structure.

An idea of the neural network is from a neuron structure of brain tissue. For example, each neuron performs a weighted summation operation on an input value of the neuron, and outputs an operation result by using an activation function. FIG. 7A is a diagram of a neuron structure. It is assumed that an input of the neuron is $x=[x_0, x_1, \ldots, x_n]$, and weights corresponding to the inputs are respectively $w=[w, w_1, \ldots, w_n]$, where $w_i$ is used as a weight of $x_i$, and is used to weight $x_i$. An offset for performing weighted summation on the input values based on the weights is, for example, b. There may be a plurality of forms of the activation function. Assuming that an activation function of a neuron is $y=f(z)=\max(0, z)$, an output of the neuron is $$y = f\left(\sum_{i=0}^{i=n} w_i * x_i + b\right) = \max\left(0, \sum_{i=0}^{i=n} w_i * x_i + b\right).$$

For another example, if an activation function of a neuron is $y=f(z)=z$, an output of the neuron is $$y = f\left(\sum_{i=0}^{i=n} w_i * x_i + b\right) = \sum_{i=0}^{i=n} w_i * x_i + b.$$

b may be any possible value, for example, a decimal, an integer (for example, 0, a positive integer, or a negative integer), or a complex number. Activation functions of different neurons in a neural network may be the same or different.

The neural network generally includes a plurality of layers, and each layer may include one or more neurons. A depth and/or a width of the neural network is increased, so that an expression capability, or referred to as a function fitting capability, of the neural network can be improved, and a more powerful information extraction and abstraction modeling capability can be provided for a complex system. The depth of the neural network may be a quantity of layers included in the neural network, and a quantity of neurons included in each layer may be referred to as a width of the layer. In an implementation, the neural network includes an input layer and an output layer. The input layer of the neural network performs neuron processing on received input information, and transfers a processing result to the output layer, and the output layer obtains an output result of the neural network. In another implementation, the neural network includes an input layer, a hidden layer, and an output layer. The input layer of the neural network performs neuron processing on received input information, and transfers a processing result to the hidden layer in the middle. The hidden layer performs calculation on the received processing result, to obtain a calculation result. The hidden layer transfers the calculation result to the output layer or an adjacent hidden layer, and finally the output layer obtains an output result of the neural network. One neural network may include one hidden layer, or include a plurality of hidden layers that are sequentially connected. This is not limited.

As described above, each neuron performs a weighted summation operation on the input value of the neuron, and generates the output by using a non-linear function. The weights of the weighted summation operation of the neurons in the neural network and the non-linear function are referred to as parameters of the neural network. A neuron whose non-linear function is max{0, x} is used as an example. A parameter of a neuron on which an operation $$\max\left\{0, \sum_{i=0}^{n} w_i x_i + b\right\}$$

is performed is the weight $w=[w, w_1, \ldots, w_n]$, where the offset of weighted summation is b. Parameters of all the neurons in the neural network form the parameters of the neural network.

Figure 7B:
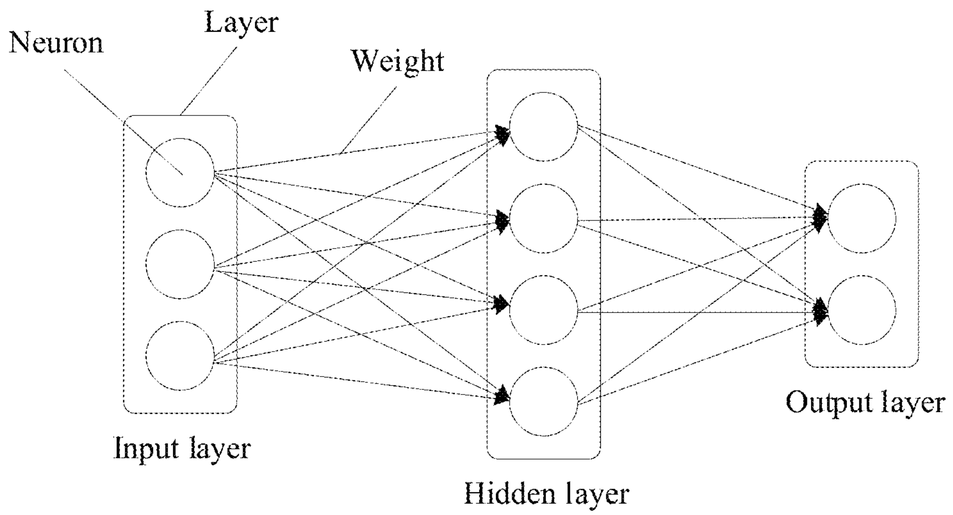
FIG. 7B is a diagram of a layer relationship of a neural network.

The neural network in this disclosure is, for example, a deep neural network (deep neural network, DNN). The DNN generally has a plurality of hidden layers, and a weight corresponding to each neuron in the DNN is a model parameter of the DNN. The DNN can optimize the model parameters by using a supervised learning or unsupervised learning policy. Based on a network construction manner, the DNN may include a feedforward neural network (feedforward neural network, FNN), a convolutional neural network (convolutional neural network, CNN), and a recurrent neural network (recurrent neural network, RNN). The FNN is used as an example. FIG. 7B shows a neural network structure. A feature of the FNN is that every two neurons at adjacent layers are completely connected.

The CNN can be applied to processing data with a grid-like structure. The data with the grid-like structure may include time series data (time axis discrete sampling), image data (two-dimensional discrete sampling), and the like. A convolutional layer of the CNN does not perform a convolution operation by using all input information at a time. Instead, one or more windows of a specific size are set, and some input information is intercepted by using each window to perform the convolution operation. This design can greatly reduce a calculation amount of the model parameters. Specifically, performing a convolution operation on any one of the one or more windows of the specific size may be understood as performing a multiplication and then addition operation on a coefficient (for example, a weighting coefficient) of the window and some input information intercepted by the window. Output information corresponding to the window may be obtained through the convolution operation. Coefficients of different windows may be independently configured. For example, different coefficients may be configured for different windows, so that the CNN can better extract features of the input data. The coefficient of the window may include a convolution kernel. Optionally, types of some input information intercepted by different windows may be different. For example, a person and an object in an image may be understood as different types of information. The person in the image may be intercepted by one of two specified windows of the specific size, and the object in the image may be intercepted by another window.

The RNN is a DNN that uses feedback time series information. An input of the RNN includes a new input value at a current moment and a part of an output value of the RNN at a previous moment, where the output value at the previous moment may be determined based on an activation function and an input at the previous moment. The RNN is suitable for obtaining a sequence feature having a time correlation, and is suitable for application scenarios such as speech recognition and channel encoding and decoding.

In addition, in a training process of the neural network, a loss function may be defined. The loss function describes a difference or a difference value between an output value of the neural network and an ideal target value. A specific form of the loss function is not limited in this disclosure. The training process of the neural network is a process in which the parameters of the neural network are adjusted, so that a value of the loss function is less than a threshold, or a value of the loss function meets a target requirement. The parameters of the neural network are adjusted. For example, at least one of the following parameters is adjusted: a quantity of layers of the neural network, a width of the neural network, a weight of a neuron, or a parameter in an activation function of a neuron.

Specifically, in a downlink positioning scenario, the access network device or a cell node of the access network device sends a PRS to the terminal device. The terminal device measures the PRS to obtain a downlink channel response. Then, the terminal device may report the obtained downlink channel response to the LMF, or the terminal device may extract a feature from the obtained downlink channel response based on the AI model, and reports the feature based on the downlink channel response to the LMF. Further, the LMF may determine the location of the terminal device based on the AI model and the obtained downlink channel response or the feature based on the downlink channel response. For example, in an uplink positioning scenario, the terminal device may send an SRS to the access network device or a cell node of the access network device. The access network device or the cell of the access network device measures the SRS to obtain an uplink channel response. Then, the access network device or the cell node of the access network device may report the obtained uplink channel response to the LMF, or the access network device or the cell node of the access network device may extract a feature from the obtained uplink channel response based on the AI model, and report the feature based on the uplink channel response to the LMF. Further, the LMF may determine the location of the terminal device based on the AI model and the obtained uplink channel response or the feature based on the uplink channel response.

Figure 8A:
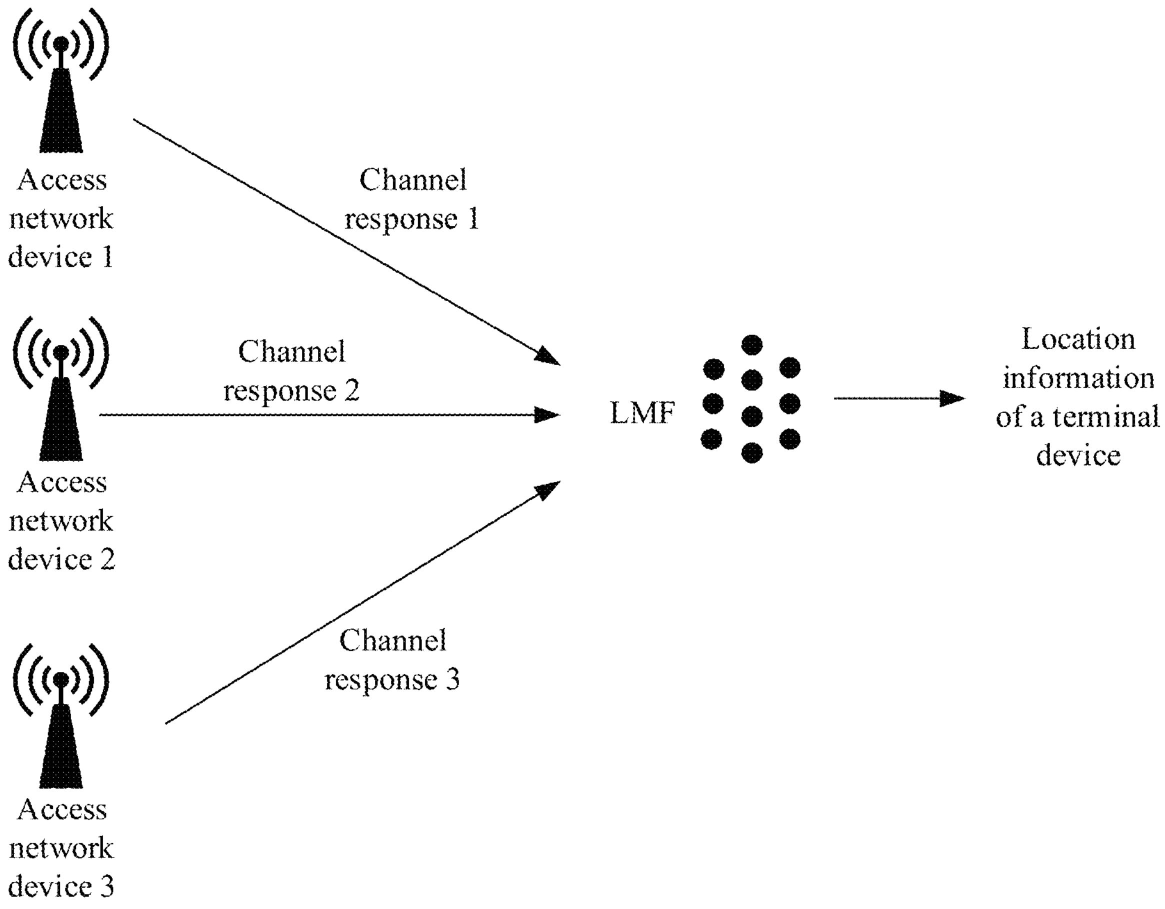
FIG. 8A is a diagram of an AI-based uplink positioning scenario.

For example, FIG. 8A shows an AI-based uplink positioning scenario. An AI model may be deployed on an LMF side. A plurality of access network devices, namely, an access network device 1, an access network device 2, and an access network device 3, send channel responses to the LMF. The LMF uses the channel responses of the plurality of access network devices as an input of the AI model, and outputs location information of a terminal device. Assuming that a quantity of antennas of the access network device is 16, and a quantity of subcarriers is 4096, a channel response sent by each access network device to the LMF includes 16*4096 pieces of complex number information.

Figure 8B:
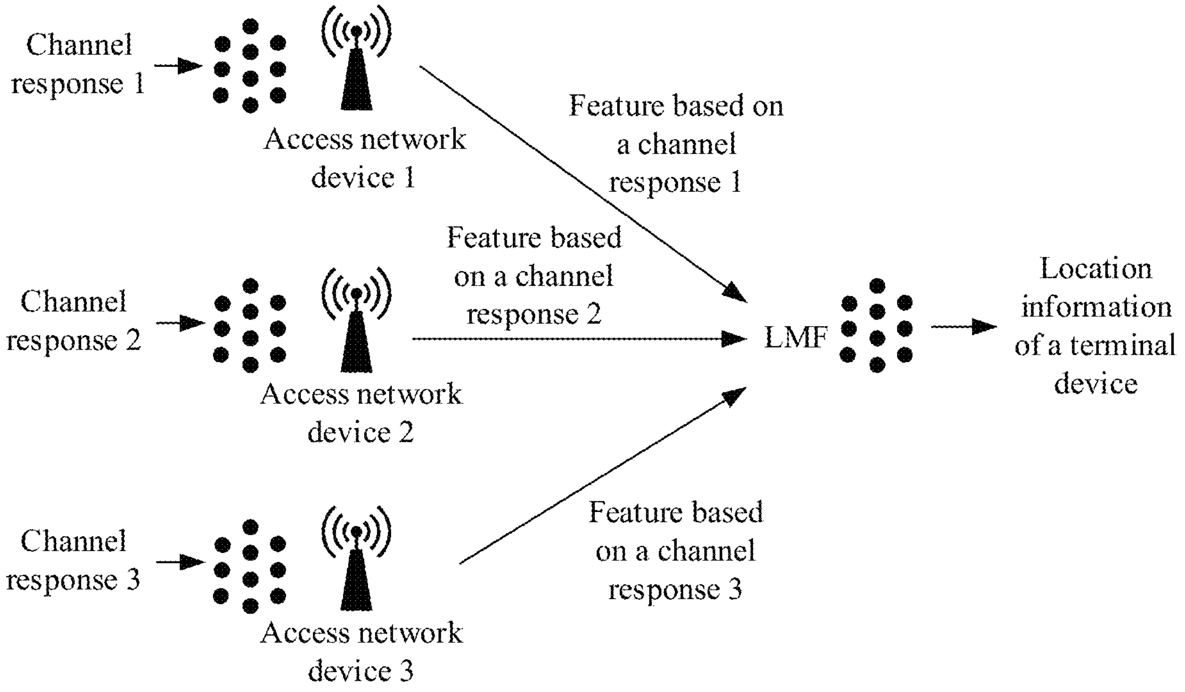
FIG. 8B is a diagram of another AI-based uplink positioning scenario.

For example, FIG. 8B shows another AI-based uplink positioning scenario. An AI model may be deployed on an access network device side and an LMF side. Each of a plurality of access network devices uses an obtained channel response as an input of the AI model based on the AI model, and outputs a feature that is based on the channel response and that is briefly referred to as a channel feature. Further, each of the plurality of access network devices sends the channel feature to the LMF. A dimension of the channel feature is determined based on an output dimension of the AI model on the access network device side. For example, the access network device side may extract a channel feature whose dimension is [128] from a channel response whose dimension is [16,4096], and send the channel feature to the LMF. The LMF uses the channel feature of the plurality of access network devices as the input of the AI model based on the AI model deployed on the LMF, and outputs location information of a terminal device. Assuming that a quantity of antennas of the access network device is 16, and a quantity of subcarriers is 4096, a channel response sent by each access network device to the LMF includes 16*4096 pieces of complex number information.

For ease of understanding, the foregoing manner of positioning the terminal device by using the measurement object may also be referred to as a non-AI positioning manner or a non-AI positioning mode. A manner in which the terminal device is positioned by analyzing the channel information by using the AI technology may also be referred to as an AI positioning manner or an AI positioning mode. It may be learned from the foregoing description that, in the non-AI positioning manner, if a first path is weak or a reference signal is transmitted over an NLOS path, an identified first path differs greatly from a real first path, and accuracy of the location of the terminal device obtained through estimation is poor. However, in the AI positioning manner, positioning accuracy can be enhanced by using the AI technology, but transmission overheads related to channel information are large, causing a waste of air interface resources.

Based on this, this disclosure provides a communication method that can be used to position a terminal device. In this disclosure, a positioning manner that meets a positioning accuracy requirement may be dynamically switched, to implement adaptive adjustment of the positioning manner, and flexibly make a compromise between positioning accuracy and information transmission overheads.

The following describes in detail, by using Solution 1 to Solution 3, the communication method provided in this disclosure.

Solution 1

Figure 9:
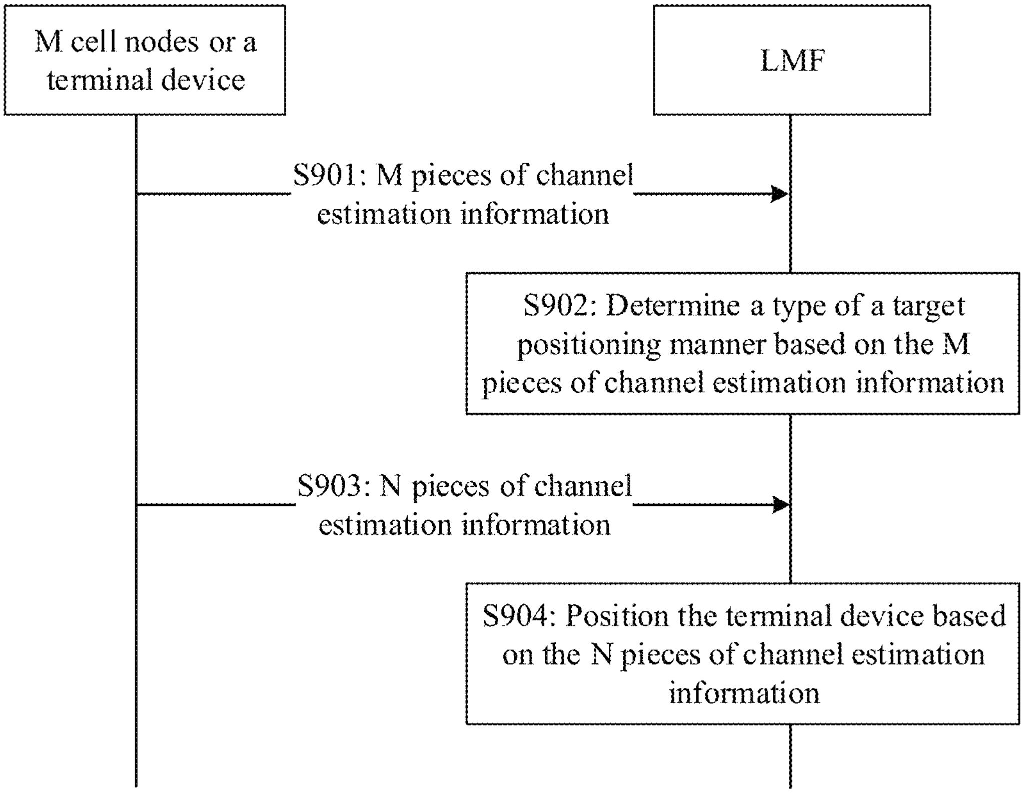
FIG. 9 is a schematic flowchart of a communication method according to this disclosure.

FIG. 9 shows a communication method. The method mainly includes the following procedure.

S901: An LMF obtains M pieces of channel estimation information.

An $m^{th}$ piece of channel estimation information in the M pieces of channel estimation information is estimation information of a channel between an $m^{th}$ cell node in M cell nodes and a terminal device, M is a positive integer, and m is a positive integer ranging from 1 to M. The M pieces of channel estimation information are used to determine a type of a target positioning manner.

Specifically, as shown in FIG. 9, the LMF may obtain the M pieces of channel estimation information from the terminal device or the M cell nodes. The $m^{th}$ piece of channel estimation information in the M pieces of channel estimation information may come from the $m^{th}$ cell node or the terminal device. For example, in an uplink positioning scenario, the $m^{th}$ cell node sends the $m^{th}$ piece of channel estimation information to the LMF, or the $m^{th}$ cell node sends the $m^{th}$ piece of channel estimation information to another core network element, and the another core network element sends, to the LMF, the M pieces of channel estimation information obtained from the M cell nodes. In a downlink positioning scenario, the terminal device sends the $m^{th}$ piece of channel estimation information to the LMF. Optionally, a value of M may be determined based on a quantity of cell nodes that can participate in positioning the terminal device in a communication environment, and may be 1 or may be a positive integer greater than 1, for example, 2 or 3.

For ease of understanding, the following uses an example in which a first device represents the $m^{th}$ cell node in the M cell nodes, the terminal device, or the another core network element for description. The first device may actively send the $m^{th}$ piece of channel estimation information to the LMF. The $m^{th}$ piece of channel estimation information may be estimation information that can be obtained by the first device side by measuring a channel between the cell node and the terminal device based on a capability of the first device side. Optionally, a reporting periodicity of the M pieces of channel estimation information may be preconfigured by the LMF or a third-party network element, so that the first device may periodically report the $m^{th}$ piece of channel estimation information, so that the LMF is triggered to adjust a positioning manner.

Optionally, a positioning requirement for determining a positioning manner may be preconfigured in the LMF, the terminal device, and the cell node. The positioning requirement indicates a condition that a positioning indicator needs to meet. When sending the $m^{th}$ piece of channel estimation information, the first device may determine, based on the positioning requirement, a parameter type indicated by the $m^{th}$ piece of channel estimation information, to ensure that the sent $m^{th}$ piece of channel estimation information can participate in determining a value of the positioning indicator.

S902: The LMF determines the type of the target positioning manner based on the M pieces of channel estimation information.

Specifically, the LMF may determine the value of the positioning indicator based on the obtained M pieces of channel estimation information. Then, the LMF determines the type of the target positioning manner based on the value of the positioning indicator and the positioning requirement.

Corresponding to the description in S901, the following uses an example to describe the positioning indicator and the type of the corresponding target positioning manner.

Example 1: The positioning indicator is a type of a communication path between the cell node and the terminal device, and the type of the communication path includes a line of sight path (LOS path) or a non-line of sight path (NLOS path). The positioning requirement corresponding to the positioning indicator is determining, based on a quantity of LOS paths/NLOS paths, whether to enable an AI mode, that is, whether to use an AI positioning manner. The LMF may determine, based on the obtained M pieces of channel estimation information, whether the type of the communication path between each of the M cell nodes and the terminal device is an LOS path or an NLOS path, and further determine a quantity of LOS paths or a quantity of NLOS paths.

For example, when the quantity of LOS paths is greater than or equal to a specified quantity, or a proportion of the quantity of LOS paths in M is greater than or equal to a specified proportion, the LMF may determine that the type of the target positioning manner is a non-AI positioning manner.

For example, when the quantity of LOS paths is less than a specified quantity, or a proportion of the quantity of LOS paths in M is less than a specified proportion, the LMF may determine that the type of the target positioning manner is an AI positioning-enabled mode. The AI positioning-enabled mode includes an AI positioning manner, or a combination of an AI positioning manner and a non-AI positioning manner.

Example 2: The positioning indicator is positioning accuracy corresponding to a currently applied positioning manner.

The positioning requirement corresponding to the positioning indicator is a requirement for the positioning accuracy, or a positioning accuracy requirement that needs to be met by a positioning manner. The LMF may determine, based on the obtained M pieces of channel estimation information, the positioning accuracy corresponding to the currently applied positioning manner, determine whether the positioning accuracy meets a positioning accuracy requirement specified or preset by a location requester, and further determine the type of the target positioning manner based on a determining result.

For example, the currently applied positioning manner is an AI positioning manner. If positioning accuracy corresponding to the AI positioning manner does not meet the positioning accuracy requirement, the LMF may determine that the type of the target positioning manner is a non-AI positioning manner. If positioning accuracy corresponding to the AI positioning manner meets the positioning accuracy requirement, the LMF may determine that the type of the target positioning manner is the AI positioning-enabled mode. Optionally, for whether the AI positioning-enabled mode is the AI positioning manner or the combination of the AI positioning manner and the non-AI positioning manner, refer to the following manner for implementation: When a difference between the positioning accuracy corresponding to the AI positioning manner and the positioning accuracy requirement is greater than or equal to a specified difference value, the LMF may determine that the AI positioning-enabled mode is the AI positioning manner; or when a difference between the positioning accuracy corresponding to the AI positioning manner and the positioning accuracy requirement is less than a specified difference value, the LMF may determine that the AI positioning-enabled mode is the combination of the AI positioning manner and the non-AI positioning manner.

For another example, the type of the currently applied positioning manner is the non-AI positioning manner. If positioning accuracy corresponding to the non-AI positioning manner meets the positioning accuracy requirement, the LMF may determine that the type of the target positioning manner is the non-AI positioning manner, that is, keep the currently applied positioning manner unchanged; or if positioning accuracy corresponding to the non-AI positioning manner does not meet the positioning accuracy requirement, the LMF may determine that the type of the target positioning manner is the AI positioning manner.

Specifically, for determining, by the LMF, whether the non-AI positioning manner meets the positioning accuracy requirement, refer to the following manner for implementation.

The LMF may determine, based on accuracy of the obtained measurement object, whether the non-AI positioning manner meets the positioning accuracy requirement. The positioning method based on the TDOA shown in FIG. 2 is used as an example. When reporting the time difference of arrival, the terminal device may further report information for indicating accuracy of measuring the time difference of arrival, for example, OTDOA-MeasQuality, corresponding to the interval range of the time difference of arrival shown by using the dashed line in FIG. 2. Further, the LMF may determine, based on a size of an intersection set (namely, the overlapping part shown in FIG. 2) between the obtained interval ranges of the plurality of time differences of arrival, whether the positioning accuracy of the non-AI positioning manner meets the positioning accuracy requirement.

For determining, by the LMF, whether the AI positioning manner meets the positioning accuracy requirement, refer to the following manner for implementation.

Figure 10:
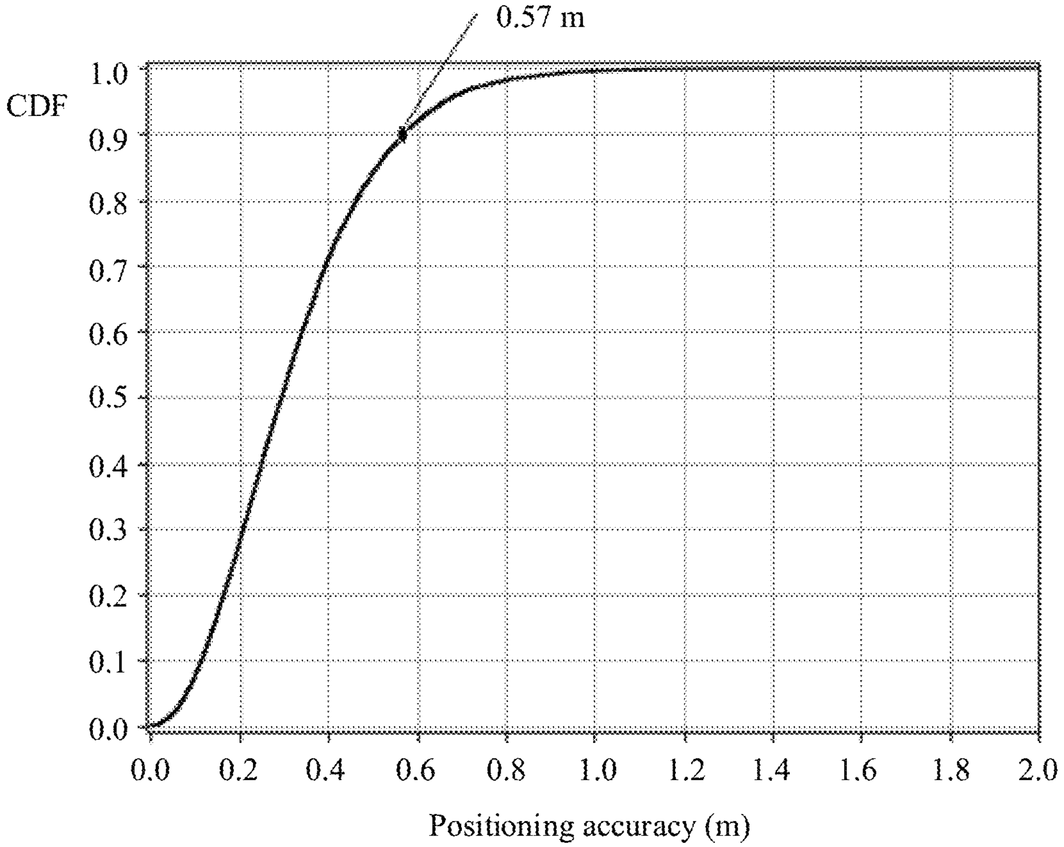
FIG. 10 is a diagram of probability-related positioning accuracy.

For example, the positioning accuracy corresponding to the AI positioning manner may be determined based on a statistical error during offline training. For example, during offline training, a data set is divided into a training set and a validation set. An AI model trained based on the training set is tested on the validation set, to obtain an error of each sample in the validation set. Error statistics collection is performed to obtain an error cumulative distribution function (cumulative distribution function, CDF) shown in FIG. 10. In this case, positioning accuracy with different probabilities can be obtained. For example, positioning accuracy corresponding to 90% is 0.57 m.

For example, positioning accuracy corresponding to the AI positioning manner may be further determined based on a distance between samples in the training set. Generally, AI-based positioning relies on a large amount of collected fingerprint information. To be specific, a beacon is placed at an interval of a distance in an area, and a reference signal is sent between a beacon node and a base station, to form samples in the training set. Therefore, the distance between beacon nodes may reflect positioning accuracy corresponding to the AI positioning manner. Beacons may be placed in different areas at different densities. When the AI positioning manner is used, the LMF may perform matching between a received feature and a feature in a database to determine an area in which the terminal device is located, to obtain positioning accuracy of the area, that is, positioning accuracy corresponding to the AI positioning manner; and further determine whether positioning accuracy of the AI positioning manner meets the positioning accuracy requirement.

For example, the LMF may train an AI model for obtaining positioning accuracy. An input of the AI model may be one or more pieces of the following information: a channel response, channel quality, an antenna configuration, a reference signal configuration, and the like. An output is positioning accuracy.

For example, a relationship table may also be deployed in the LMF. The relationship table stores a correspondence between positioning accuracy and one or more pieces of the following information: a channel response, channel quality, an antenna configuration, a reference signal configuration, and the like. That is, when obtaining one or more pieces of the following information: the channel response, the channel quality, the antenna configuration, the reference signal configuration, and the like, the LMF may read the corresponding positioning accuracy from the relationship table. Optionally, the relationship table may be obtained through statistics collection based on offline training data.

Example 3: The positioning indicator is positioning accuracy corresponding to an AI positioning manner and positioning accuracy corresponding to a non-AI positioning manner.

The positioning requirement corresponding to the positioning indicator is determining whether to enable an AI mode based on a positioning accuracy difference between the AI positioning manner and the non-AI positioning manner. In this case, the LMF may determine, based on the obtained M pieces of channel estimation information, the positioning accuracy corresponding to the AI positioning manner and the positioning accuracy corresponding to the non-AI positioning manner. Further, the LMF may determine the type of the target positioning manner based on the positioning accuracy difference between the AI positioning manner and the non-AI positioning manner.

For example, when the positioning accuracy corresponding to the AI positioning manner is higher than the positioning accuracy corresponding to the non-AI positioning manner, the LMF may determine that the type of the target positioning manner is the AI positioning manner. Alternatively, when the positioning accuracy corresponding to the non-AI positioning manner is higher than the positioning accuracy corresponding to the AI positioning manner, the LMF may determine that the type of the target positioning manner is the non-AI positioning manner. Alternatively, when the positioning accuracy difference between the non-AI positioning manner and the AI positioning manner is less than a specified difference value, the LMF may determine that the type of the target positioning manner is the non-AI positioning manner. This is because positioning is performed based on a measurement object in the non-AI positioning manner. Compared with the AI positioning manner in which positioning is performed based on channel information, the non-AI positioning manner can reduce transmission overheads.

S903: The LMF obtains N pieces of channel estimation information based on the type of the target positioning manner.

The N pieces of channel estimation information are used to position the terminal device, an $n^{th}$ piece of channel estimation information in the N pieces of channel estimation information is estimation information of a channel between an $n^{th}$ cell node in N cell nodes and the terminal device, the N cell nodes are included in the M cell nodes, N is a positive integer greater than 1 and less than or equal to M, and n is a positive integer ranging from 1 to N.

Specifically, as shown in FIG. 9, the LMF may obtain the N pieces of channel estimation information from the terminal device or the M cell nodes. The $n^{th}$ piece of channel estimation information in the N pieces of channel estimation information may come from the $n^{th}$ cell node in the N cell nodes included in the M cell nodes or the terminal device. For example, in an uplink positioning scenario, the $n^{th}$ cell node sends the $n^{th}$ piece of channel estimation information to the LMF, or the $n^{th}$ cell node sends the $n^{th}$ piece of channel estimation information to another core network element, and the another core network element sends, to the LMF, the N pieces of obtained channel estimation information. In a downlink positioning scenario, the terminal device sends the $n^{th}$ piece of channel estimation information to the LMF. Optionally, corresponding to the solutions described in S901 and S902, if the positioning requirement involves considering the type of the communication path, when all communication paths between the M cell nodes and the terminal device are LOS paths, N is equal to M; or when communication paths between a part of cell nodes in the M cell nodes and the terminal device are LOS paths, a value of N is the same as a quantity of the part of cell nodes corresponding to the LOS paths in the M cells. If the positioning requirement does not involve considering the type of the communication path, N may be equal to M, or a quantity of cell nodes that meet a requirement of participating in positioning the terminal device.

For ease of understanding, the following uses an example in which a second device represents the $n^{th}$ cell node in the N cell nodes, the terminal device, or the another core network device for description. The LMF may obtain the $n^{th}$ piece of channel estimation information from the second device with reference to the following manner.

After determining the type of the target positioning manner, the LMF may send second request information to the second device. The second request information is used to request channel estimation information required for positioning the terminal device, that is, the foregoing N pieces of channel estimation information. The second device sends the $n^{th}$ piece of channel estimation information to the LMF in response to the second request information.

In an optional implementation, the LMF may include, in the second request information, information for indicating the type of the target positioning manner. The second device determines, based on the information for indicating the type of the target positioning manner, the $n^{th}$ piece of channel estimation information matching the type of the target positioning manner, and reports the $n^{th}$ piece of channel estimation information to the LMF.

In another optional implementation, the LMF may determine, based on the type of the target positioning manner, parameter types indicated by the N pieces of channel estimation information that the LMF expects to obtain, where the parameter types match the type of the target positioning manner. Further, the LMF may include, in the second request information, the parameter types indicated by the N pieces of channel estimation information. The second device reports the $n^{th}$ piece of channel estimation information to the LMF based on the parameter types indicated by the N pieces of channel estimation information. In addition, it should be noted that the parameter types indicated by all of the N pieces of channel estimation information are the same. Because the N cell nodes are included in the M cell nodes, there is a case in which the second device and the first device represent a same cell node in this disclosure.

For example, if the type of the target positioning manner corresponds to a first value, that is, the type of the target positioning manner is the non-AI positioning manner, the $n^{th}$ piece of second channel estimation information in the N pieces of second channel estimation information indicates the measurement object, and the measurement object includes one or more of the following parameters: a distance between the $n^{th}$ cell node and the terminal device; a signal transmission delay or a signal transmission delay difference between the $n^{th}$ cell node and the terminal device; a signal angle of departure or a signal angle of arrival corresponding to the $n^{th}$ cell node; and a signal quality between the $n^{th}$ cell node and the terminal device.

For example, if the type of the target positioning manner corresponds to a second value, that is, the type of the target positioning manner is the AI positioning manner, the $n^{th}$ piece of second channel estimation information in the N pieces of second channel estimation information indicates channel information of the channel between the $n^{th}$ cell node and the terminal device.

For example, if the type of the target positioning manner corresponds to a third value, that is, the type of the target positioning manner is the combination of the AI positioning manner and the non-AI positioning manner, the $n^{th}$ piece of second channel estimation information in the N pieces of second channel estimation information indicates channel information of the channel between the $n^{th}$ cell node and the terminal device and the measurement object. For parameters included in the measurement object, refer to definitions in the foregoing examples. This is not limited in this disclosure.

S904: The LMF positions the terminal device based on the N pieces of channel estimation information.

Specifically, if the type of the target positioning manner is the AI positioning manner, the LMF may position the terminal device based on the AI positioning manner described above and the channel information indicated by the N pieces of channel estimation information. If the type of the target positioning manner is the non-AI positioning manner, the LMF may position the terminal device based on the non-AI positioning manner described above and the measurement object indicated by the N pieces of channel estimation information. Details are not described in this disclosure.

If the type of the target positioning manner is the combination of the AI positioning manner and the non-AI positioning manner, the LMF may position the terminal device in the AI positioning manner to obtain a first positioning result, and position the terminal device in the non-AI positioning manner to obtain a second positioning result. Further, the LMF may determine a final positioning result based on the first positioning result and the second positioning result.

Figure 11:
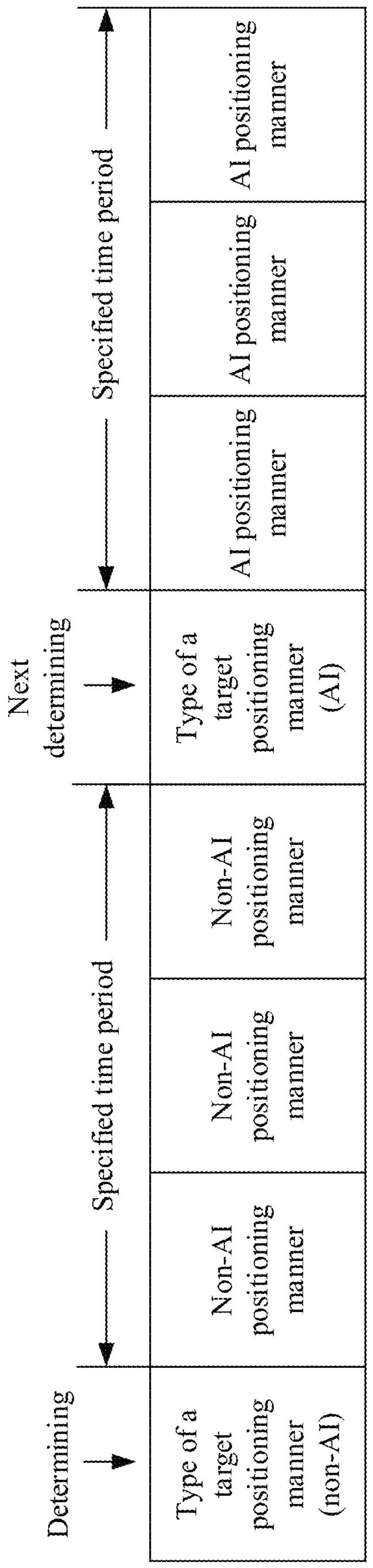
FIG. 11 is a schematic flowchart of adaptively switching a positioning manner.

Optionally, effective duration for implementing the target positioning manner may be specified, and is, for example, denoted as a specified time period or referred to as specified duration. The LMF positions the terminal device in the determined target positioning manner within the specified time period after the target positioning manner is determined. After the specified time period, the LMF needs to re-determine the type of the target positioning manner in the foregoing manner of S901 and S902, that is, re-obtain the channel estimation information that matches the target positioning manner and that is used to position the terminal device. In this design, the positioning manner can be periodically adjusted to adapt to an actual communication environment in a timely manner, and positioning accuracy is improved. Example 3 is used as an example. As shown in FIG. 11, the LMF may initiate determining at intervals of a specified time period (correspondingly perform S901 and S902), to adjust the current positioning manner. In this way, adaptive switching between the AI positioning manner, the non-AI positioning manner, or the combination of the AI positioning manner and the non-AI positioning manner is implemented.

Further optionally, the LMF may further send a positioning result and a positioning manner for calculating the positioning result to the location requester.

According to the foregoing method provided in this disclosure, the positioning manner can be dynamically adjusted to match the actual communication environment in the timely manner, and an appropriate positioning manner can be flexibly selected. This helps improve accuracy of estimating the location of the terminal device.

Solution 2

Figure 12:
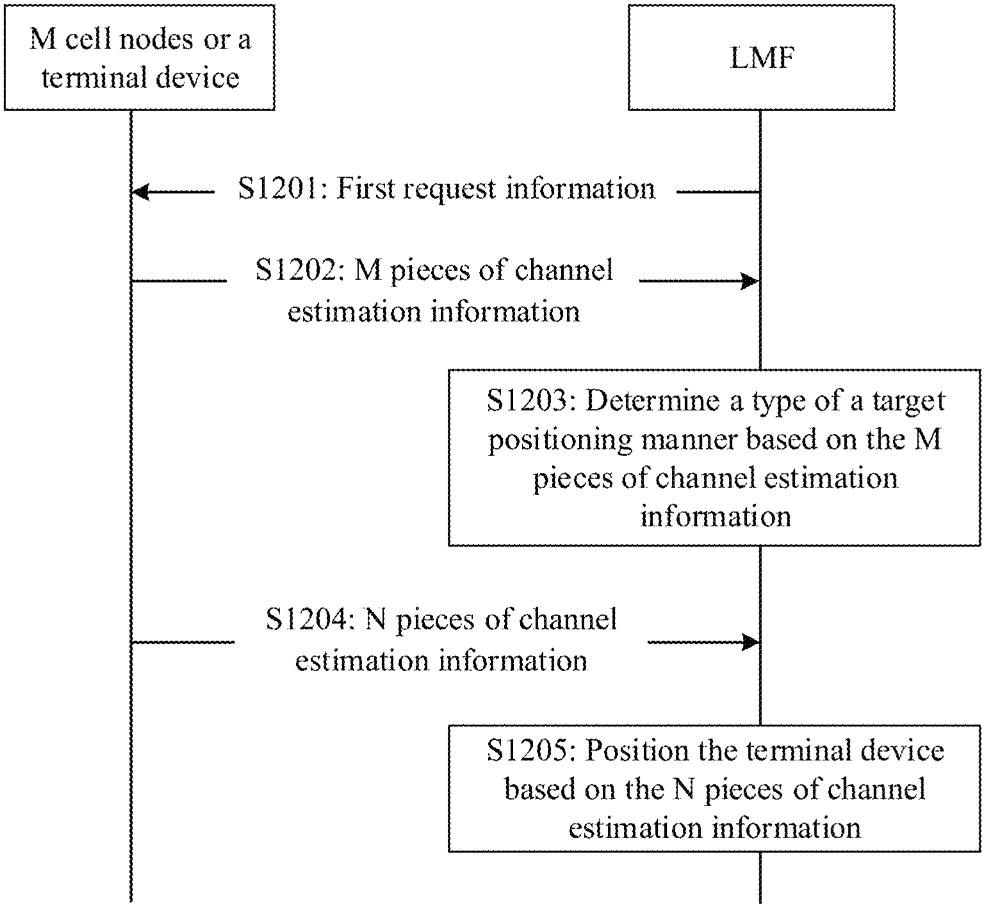
FIG. 12 is a schematic flowchart of a communication method according to this disclosure.

FIG. 12 shows a communication method. The method mainly includes the following procedure.

S1201: An LMF sends first request information, where the first request information is used to request M pieces of channel estimation information.

Specifically, as shown in FIG. 12, the LMF sends the first request information to M cell nodes or a terminal device. An $m^{th}$ piece of channel estimation information in the M pieces of channel estimation information is estimation information of a channel between an $m^{th}$ cell node in the M cell nodes and the terminal device, M is a positive integer, and m is a positive integer ranging from 1 to M. The M pieces of channel estimation information are used to determine a type of a target positioning manner.

For example, in an uplink positioning scenario, the LMF sends the first request information to an $m^{th}$ cell, to request the $m^{th}$ piece of channel estimation information related to the $m^{th}$ cell, or the LMF sends the first request information to another core network element, to forward the first request information to each cell node in the M cell nodes through the another core network element. In a downlink positioning scenario, the LMF sends the first request information to the terminal device, to request the terminal device to measure the M pieces of channel estimation information. Optionally, a value of M may be determined based on a quantity of cell nodes that can participate in positioning the terminal device in a communication environment, and may be 1 or may be a positive integer greater than 1, for example, 2 or 3.

For ease of understanding, the following uses an example in which a first device represents the $m^{th}$ cell node in the M cell nodes, the terminal device, or the another core network device for description. The LMF may send the first request information to the first device, where the first request information is used to request the $m^{th}$ piece of channel estimation information related to the first device. Then, the first device sends the $m^{th}$ piece of channel estimation information related to the first device to the LMF. Optionally, a reporting periodicity of the M pieces of channel estimation information may be preconfigured by the LMF or a third-party network element, so that the LMF may periodically send the first request information to the first device to request the first device to feed back the $m^{th}$ piece of channel estimation information, so that the LMF is triggered to adjust a positioning manner.

Specifically, the LMF may send the first request information to the first device based on a positioning requirement (or referred to as a positioning policy) for determining a positioning manner. The positioning requirement indicates a value condition that a positioning indicator needs to meet. The first request information may be used to request the M pieces of channel estimation information that the LMF expects to obtain, so that the M pieces of channel estimation information can be used to determine a value of the positioning indicator, or parameters indicated by the M pieces of channel estimation information can be used to determine a value of the positioning indicator.

Optionally, the LMF may include, in the first request information, one or more of the following information: information indicating the positioning requirement, information indicating the positioning indicator, and parameter types indicated by the M pieces of channel estimation information.

For example, the LMF may first obtain capability information of the first device based on the positioning requirement or the positioning indicator. The capability information indicates whether a value of an indicator parameter can be determined based on the $m^{th}$ piece of channel estimation information that can be obtained by the first device. Further, the LMF includes, in the first request information based on the capability information of the first device and the positioning indicator, a parameter type indicated by the channel estimation information for determining the type of the target positioning manner, namely, the parameter types indicated by the M pieces of channel estimation information. The parameter types indicated by all of the M pieces of channel estimation information are the same. The first device determines, based on the parameter types indicated by the M pieces of channel estimation information, the $m^{th}$ piece of channel estimation information that is related to the first device and that is to be sent to the LMF.

For example, the LMF may include, in the first request information, the information for indicating the positioning requirement or the positioning indicator. When obtaining the first request information, the first device determines, based on the positioning requirement (or the positioning indicator) and the capability of the first device, the $m^{th}$ piece of channel estimation information that is related to the first device and that is to be sent to the LMF, so that the $m^{th}$ piece of channel estimation information can be used to determine the value of the positioning indicator.

Optionally, the positioning requirement or the positioning indicator corresponding to the positioning requirement in the foregoing implementation may be preconfigured in the LMF, or a location requester indicates the positioning requirement or the positioning indicator corresponding to the positioning requirement to the LMF. The location requester is a network element that needs to obtain a location of the terminal device. For example, the location requester may be a third-party network element, for example, another core network element, or may be a terminal device. For example, the location requester indicates the positioning requirement to the LMF. Different positioning requirements correspond to different positioning indicators. The following describes, by using an example, the positioning indicator and the parameter types indicated by the corresponding M pieces of channel estimation information.

Example 1: The positioning indicator is a type of a communication path between the cell node and the terminal device, and the type of the communication path includes a line of sight path (LOS path) or a non-line of sight path (NLOS path).

For example, if the indicating, by the third-party network element, the positioning requirement to the LMF is: determining, based on a quantity of LOS paths/NLOS paths, whether to enable an AI mode, that is, whether to use an AI positioning manner, the LMF may determine that the positioning indicator is the type of the foregoing communication path. Based on this, the LMF may obtain the capability information of the first device, where the capability information indicates whether the first device has an LOS path/NLOS path identification capability. Further, the LMF may request the $m^{th}$ piece of channel estimation information from the first device based on the positioning manner and the positioning indicator that are currently applied to the LMF. For details, refer to the following implementation.

(1) The Positioning Manner Currently Applied to the LMF is a Non-AI Positioning Manner.

When the first device has the LOS path/NLOS path identification capability, a parameter type indicated by the $m^{th}$ piece of channel estimation information requested by the LMF from the first device is the type of the communication path between the cell node and the terminal device. Because information overheads for indicating the LOS path/NLOS path are low, the LMF may first request the type of the communication path during each positioning, to determine in a timely manner whether the AI mode needs to be enabled. The $m^{th}$ piece of channel estimation information sent by the first device indicates that the type of the communication path is the LOS path or the NLOS path. 1/0 may be used for identification. For example, "1" indicates the LOS path, and "0" indicates the NLOS path. Alternatively, the first device sends the $m^{th}$ piece of channel estimation information to indicate a probability that the type of the communication path is the LOS path/NLOS path. Based on this, when obtaining the M pieces of channel estimation information, the LMF may determine types of M communication paths. An $m^{th}$ communication path in the M communication paths is a communication path between the $m^{th}$ cell node and the terminal device.

When the terminal device and some cell nodes in the M cell nodes or all cell nodes in the M cell nodes do not have the LOS path/NLOS path identification capability, the LMF may determine that the parameter types indicated by the M pieces of channel estimation information are channel information of the channel between the cell node and the terminal device. The LMF may include, in the first request information sent to the first device, an identifier for indicating the channel information, so that the first device reports the channel information related to the first device to the LMF based on the request of the LMF. Based on this, the LMF may obtain M pieces of channel information, and an $m^{th}$ piece of channel information in the M pieces of channel information corresponds to a channel between the $m^{th}$ cell node and the terminal device. Further, the LMF may autonomously determine the types of the communication paths between the M cell nodes and the terminal device based on the obtained M pieces of channel information.

Optionally, if the $m^{th}$ piece of channel estimation information that needs to be sent by the first device is channel information, because overheads corresponding to the channel information are large, the LMF may trigger or the LMF may configure the first device to periodically report the channel information, for example, report the channel information at a specified time interval, or report the channel information based on a quantity of positioning times when the quantity of positioning times reaches a preset value. It should be noted that the periodically reporting the channel information herein is used by the LMF to periodically determine whether to enable the AI mode. During actual application, an AI determining periodicity may be defined to indicate the first device to report the channel information for determining the target positioning manner. The determining periodicity may be defined as the foregoing specified time interval, or may be defined as the foregoing specified quantity of times.

In addition, if the $m^{th}$ piece of channel estimation information that needs to be sent by the first device is a feature based on a channel response, the LMF may further carry, in the first request information for requesting, an indication of an AI model used when the first device extracts the feature based on the channel response.

(2) The Positioning Manner Currently Applied to the LMF is an AI Positioning Manner.

In an optional implementation, because the AI positioning manner is currently applied to the LMF, it indicates that the LMF has obtained channel information of the channel between the cell node and the terminal device. In this case, the LMF may determine a type of a communication path between the cell node and the terminal device based on the historically obtained channel information. In this manner, the LMF may not need to send the first request information to the first device.

In another optional implementation, when the first device has the LOS path/NLOS path identification capability, the first request information sent by the LMF to the first device includes that the parameter types indicated by the M pieces of channel estimation information are a type of a communication path between the cell node and the terminal device. Further, the first device reports, to the LMF based on the request of the LMF, a type of a communication path related to the first device, and the LMF may determine types of M communication paths based on the obtained M pieces of channel estimation information. An $m^{th}$ communication path in the M communication paths is a communication path between the $m^{th}$ cell node and the terminal device.

Example 2: The positioning indicator is positioning accuracy corresponding to a currently applied positioning manner.

Optionally, the location requester indicates to the LMF that the positioning requirement is a requirement for positioning accuracy. For example, an indicator meets a positioning accuracy requirement that a probability of 90% has an error less than 1 m, or a preset positioning accuracy requirement exists. In this case, the LMF may determine, based on the positioning accuracy requirement, that the positioning indicator is the positioning accuracy corresponding to the current positioning manner. The LMF may request related channel estimation information from the first device based on the positioning manner and the positioning indicator that are currently applied to the LMF. For details, refer to the following implementation.

(1) The Positioning Manner Currently Applied to the LMF is a Non-AI Positioning Manner.

The $m^{th}$ piece of channel estimation information requested by the LMF from the first device corresponds to the measurement object mentioned above. Specifically, the $m^{th}$ piece of channel estimation information indicates one or more of the following parameters: a distance between the $m^{th}$ cell node and the terminal device; a signal transmission delay or a signal transmission delay difference between the $m^{th}$ cell node and the terminal device; a signal angle of departure or a signal angle of arrival corresponding to the $m^{th}$ cell node; and a signal quality between the $m^{th}$ cell node and the terminal device.

Further, the first device reports, to the LMF based on the request of the LMF, a measurement object related to the first device. The LMF may determine M measurement objects. An $m^{th}$ measurement object in the M measurement objects corresponds to the channel between the $m^{th}$ cell node and the terminal device.

(2) The Positioning Manner Currently Applied to the LMF is an AI Positioning Manner.

A parameter type indicated by the $m^{th}$ piece of channel estimation information requested by the LMF from the first device is channel information of the channel between the $m^{th}$ cell node and the terminal device, and the channel information may be used by the LMF to autonomously determine a type of a communication path between the $m^{th}$ cell node and the terminal device. By analogy, the LMF obtains the M pieces of channel estimation information, and may determine a type of a communication path between each of M cells and the terminal device based on the M pieces of channel estimation information.

Optionally, if the $m^{th}$ piece of channel estimation information that needs to be sent by the first device is channel information, because overheads corresponding to the channel information are large, the LMF may trigger or the LMF may configure the first device to periodically report the channel information, for example, report the channel information at a specified time interval, or report the channel information based on a quantity of positioning times when the quantity of positioning times reaches a preset value. It should be noted that the periodically reporting the channel information herein is used by the LMF to periodically determine whether to enable the AI mode. During actual application, an AI determining periodicity may be defined to indicate the first device to report the channel information for determining the positioning manner. The determining periodicity may be defined as the foregoing specified time interval, or may be defined as the foregoing specified quantity of times.

In addition, if the $m^{th}$ piece of channel estimation information that needs to be sent by the first device is a feature based on a channel response, the LMF may further carry, in the first request information, an indication of an AI model used when the first device extracts the feature based on the channel response.

Further, the first device reports, to the LMF based on the request of the LMF, channel information related to the first device. The LMF may determine M pieces of channel information. An $m^{th}$ piece of channel information in the M pieces of channel information corresponds to the channel between the $m^{th}$ cell node and the terminal device.

In addition, optionally, because the measurement object corresponds to low transmission overheads, if the first device determines, in Example 1 or Example 2, that the channel information is to be reported to the LMF, the first device may further report the related measurement object to the LMF while reporting the channel information.

Example 3: The positioning indicator is positioning accuracy corresponding to an AI positioning manner and positioning accuracy corresponding to a non-AI positioning manner.

Optionally, the third-party network element indicates, to the LMF, that the positioning requirement is determining, based on a positioning accuracy difference between the AI positioning manner and the non-AI positioning manner, whether to enable an AI mode. In this case, the LMF may determine, based on the positioning requirement, that the positioning indicator includes the positioning accuracy corresponding to the AI positioning manner and the positioning accuracy corresponding to the non-AI positioning manner. Based on this, the $m^{th}$ piece of channel estimation information requested by the LMF from the first device based on the positioning indicator includes a measurement object corresponding to the non-AI positioning manner and channel information corresponding to the AI positioning manner. For a specific solution of requesting the channel information, refer to the implementation described in (2) in Example 2. Details are not described again in this disclosure.

Further, the first device reports, to the LMF based on the request of the LMF, the measurement object and the channel information that are related to the first device. The LMF may obtain M measurement objects and M pieces of channel information. An $m^{th}$ measurement object in the M measurement objects corresponds to a channel between the $m^{th}$ cell node and the terminal device. An $m^{th}$ piece of channel information in the M pieces of channel information corresponds to the channel between the $m^{th}$ cell node and the terminal device.

S1202: The LMF obtains the M pieces of channel estimation information.

As shown in FIG. 12, the LMF may obtain the M pieces of channel estimation information from the terminal device or the M cell nodes.

The $m^{th}$ piece of channel estimation information in the M pieces of channel estimation information may come from the $m^{th}$ cell node or the terminal device. For example, in an uplink positioning scenario, the $m^{th}$ cell node sends the $m^{th}$ piece of channel estimation information to the LMF, or the $m^{th}$ cell node sends the $m^{th}$ piece of channel estimation information to the core network element, and the core network element sends, to the LMF, the M pieces of channel estimation information obtained from the M cell nodes. In a downlink positioning scenario, the terminal device sends the $m^{th}$ piece of channel estimation information to the LMF. Optionally, a value of M may be determined based on a quantity of cell nodes that can participate in positioning the terminal device in a communication environment, and may be 1 or may be a positive integer greater than 1, for example, 2 or 3.

S1203: The LMF determines the type of the target positioning manner based on the M pieces of channel estimation information.

Specifically, for this step, refer to the implementation of S902. Details are not described again in this disclosure.

S1204: The LMF obtains N pieces of channel estimation information based on the type of the target positioning manner.

As shown in FIG. 12, the LMF may obtain the N pieces of channel estimation information from the terminal device or the M cell nodes. The $n^{th}$ piece of channel estimation information in the N pieces of channel estimation information may come from the $n^{th}$ cell node in the N cell nodes included in the M cell nodes or the terminal device.

Specifically, for this step, refer to the implementation of S903. Details are not described again in this disclosure.

S1205: The LMF positions the terminal device based on the N pieces of channel estimation information.

Specifically, for this step, refer to the implementation of S904. Details are not described again in this disclosure.

According to the foregoing method provided in this disclosure, the LMF indicates the terminal device or the cell node to report the channel estimation information for determining the positioning manner, so that the positioning manner can be dynamically adjusted to match the actual communication environment in a timely manner, and an appropriate positioning manner can be flexibly selected. This helps improve accuracy of estimating the location of the terminal device.

Solution 3

Figure 13:
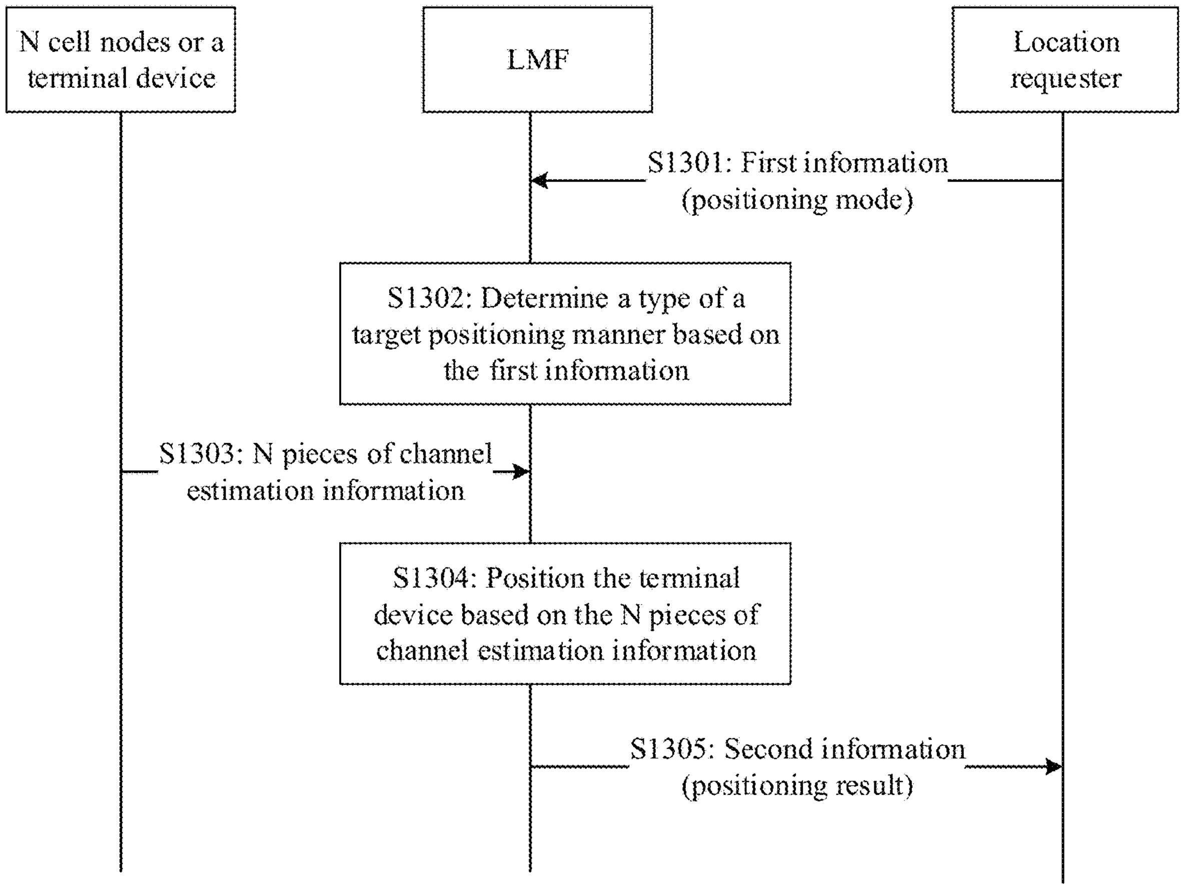
FIG. 13 is a schematic flowchart of a communication method according to this disclosure.

FIG. 13 shows a communication method. The method mainly includes the following procedure.

S1301: A location requester sends first information to an LMF, where the first information indicates a positioning mode expected by the location requester.

The positioning mode may also be described as a type of a positioning manner. The location requester may be a terminal device or another third-party network element, and the location requester may also be described as a third device or another name. This is not limited in this disclosure.

The positioning mode indicated by the first information is an AI positioning manner; the positioning mode indicated by the first information is a non-AI positioning manner; the positioning mode indicated by the first information is a combination of an AI positioning manner and a non-AI positioning manner; or the positioning mode indicated by the first information is an automatic switching mode, where the automatic switching mode indicates that the LMF dynamically adjusts a positioning manner to an AI positioning manner, a non-AI positioning manner, or a combination of an AI positioning manner and a non-AI positioning manner.

Optionally, when the first information indicates that the positioning mode is the automatic switching mode, the first information may further include information for indicating a positioning requirement. The positioning requirement may be used by the LMF to determine a target positioning manner, and the positioning requirement indicates a value condition that a positioning indicator needs to meet.

Optionally, the location requester may select a positioning mode based on a service requirement. For example, when the location requester is a terminal device, there may be a specific requirement on air interface overheads. For example, if the location requester needs a positioning service with a short delay and does not have a high requirement on positioning accuracy, it may be determined that the positioning mode indicated by the first information is the non-AI positioning manner. If the location requester needs a service with high positioning accuracy and does not have a high requirement on a delay, it may be determined that the positioning mode indicated by the first information is the AI positioning manner. If the location requester needs a robust positioning result and does not have a high requirement on a delay and air interface overheads, it may be determined that the positioning mode indicated by the first information is the combination of the AI positioning manner and the non-AI positioning manner. If the location requester needs a robust positioning result and expects a delay and air interface overheads to be as small as possible, it may be determined that the positioning mode indicated by the first information is the automatic switching mode.

Further optionally, the location requester may further obtain capability information of the LMF before selecting the positioning mode or sending the first information, to determine a positioning mode supported and/or a positioning mode not supported by the capability of the LMF; and then send the first information to the LMF based on the capability of the LMF, where the positioning mode indicated by the first information is the positioning mode supported by the LMF.

S1302: The LMF determines a type of the target positioning manner based on the first information.

Corresponding to S1301, if the location requester does not consider the capability of the LMF when indicating the positioning mode by using the first information, the LMF may determine, based on the capability of the LMF, whether the positioning mode indicated by the first information is supported. If the positioning mode is supported, the LMF determines the positioning mode indicated by the first information as the type of the target positioning manner. If the positioning mode is not supported, in an optional implementation, the LMF may report the capability of the LMF to the location requester, and then the location requester indicates another expected positioning mode to the LMF based on the service requirement. This process is repeated until the LMF can support the positioning mode expected by the location requester. In another optional implementation, the LMF may autonomously determine the type of the target positioning manner based on the capability of the LMF, and notify the location requester of the type of the target positioning manner.

Corresponding to S1301, if the location requester considers the capability of the LMF when indicating the positioning mode by using the first information, and the positioning mode indicated by the first information meets the capability of the LMF, the LMF may determine the positioning mode indicated by the first information as the type of the target positioning manner.

In addition, if the positioning mode indicated by the first information is the automatic switching mode, the LMF may determine the type of the target positioning manner in real time or periodically according to S901 and S902 in Solution 1 or S1201 to S1203 in Solution 2. Details are not described in this disclosure.

S1303: The LMF obtains N pieces of channel estimation information based on the type of the target positioning manner.

The N pieces of channel estimation information are used to position the terminal device, and an $n^{th}$ piece of channel estimation information in the N pieces of channel estimation information is estimation information of a channel between an $n^{th}$ cell node in N cell nodes participating in positioning the terminal device and the terminal device. Nis a positive integer, and n is a positive integer ranging from 1 to N.

Specifically, as shown in FIG. 13, the LMF may obtain the N pieces of channel estimation information from the N cell nodes or the terminal device, and the N pieces of channel estimation information match the type of the target positioning manner. The $n^{th}$ piece of channel estimation information in the N pieces of channel estimation information may come from the $n^{th}$ cell node in the N cell nodes included in the M cell nodes or the terminal device. For example, in an uplink positioning scenario, the $n^{th}$ cell node sends the $n^{th}$ piece of channel estimation information to the LMF, or the $n^{th}$ cell node sends the $n^{th}$ piece of channel estimation information to a core network element, and the core network element sends, to the LMF, the N pieces of obtained channel estimation information. In a downlink positioning scenario, the terminal device sends the $n^{th}$ piece of channel estimation information to the LMF.

For ease of understanding, that a second device represents the $n^{th}$ cell node in the N cell nodes, the terminal device, or the core network device is used as an example. The LMF may obtain the $n^{th}$ piece of channel estimation information from the second device with reference to the following manner.

After determining the type of the target positioning manner, the LMF may send second request information to the second device. The second request information is used to request channel estimation information required for positioning the terminal device, that is, the foregoing N pieces of channel estimation information. The second device sends the $n^{th}$ piece of channel estimation information to the LMF in response to the second request information.

In an optional implementation, the LMF may include, in the second request information, information for indicating the type of the target positioning manner. The second device determines, based on the information for indicating the type of the target positioning manner, the $n^{th}$ piece of channel estimation information matching the type of the target positioning manner, and reports the $n^{th}$ piece of channel estimation information to the LMF.

In another optional implementation, the LMF may determine, based on the type of the target positioning manner, parameter types indicated by the N pieces of channel estimation information that the LMF expects to obtain, where the parameter types match the type of the target positioning manner. Further, the LMF may include, in the second request information, the parameter types indicated by the N pieces of channel estimation information. The second device reports the $n^{th}$ piece of channel estimation information to the LMF based on the parameter types indicated by the N pieces of channel estimation information.

The parameter types indicated by all of the N pieces of channel estimation information are the same. The following uses a parameter type indicated by the $n^{th}$ piece of channel estimation information as an example to describe parameter types indicated by the $n^{th}$ piece of channel estimation information corresponding to different types of positioning manners.

For example, if the type of the target positioning manner is the AI positioning manner, the $n^{th}$ piece of channel estimation information indicates channel information of the channel between the $n^{th}$ cell node and the terminal device.

For example, if the type of the target positioning manner is the non-AI positioning manner, the $n^{th}$ piece of channel estimation information indicates the measurement object, and the measurement object includes one or more of the following parameters: a distance between the $n^{th}$ cell node and the terminal device; a signal transmission delay or a signal transmission delay difference between the $n^{th}$ cell node and the terminal device; a signal angle of departure or a signal angle of arrival corresponding to the $n^{th}$ cell node; and a signal quality between the $n^{th}$ cell node and the terminal device.

For example, if the type of the target positioning manner is the combination of the AI positioning manner and the non-AI positioning manner, the $n^{th}$ piece of channel estimation information indicates channel information of the channel between the $n^{th}$ cell node and the terminal device and a measurement object, and the measurement object includes one or more of the following parameters: a distance between the $n^{th}$ cell node and the terminal device; a signal transmission delay or a signal transmission delay difference between the $n^{th}$ cell node and the terminal device; a signal angle of departure or a signal angle of arrival corresponding to the $n^{th}$ cell node; and a signal quality between the $n^{th}$ cell node and the terminal device.

S1304: The LMF positions the terminal device based on the N pieces of channel estimation information.

Specifically, the positioning result may be determined with reference to the manner described in S904. Details are not described again in this disclosure.

S1305: The LMF sends second information to the location requester, where the second information indicates the positioning result.

Optionally, the LMF may further send, to the location requester, information that indicates the target positioning manner for calculating the positioning result. This design can facilitate the location requester to select a positioning manner based on the information when subsequently requesting a location. For example, after the location requester selects the automatic switching mode as the positioning mode, the type of the target positioning manner fed back by the location requester is the non-AI positioning manner. However, the positioning result differs greatly from the positioning result predicted by the location requester by using another sensor. In this case, the location requester may re-request a positioning result obtained based on the AI positioning manner.

According to the foregoing method provided in this disclosure, the positioning manner is flexibly determined based on a requirement of the location requester, and the positioning manner is dynamically adjusted to match an actual communication environment in a timely manner. This helps improve accuracy of estimating the location of the terminal device.

Figure 14:
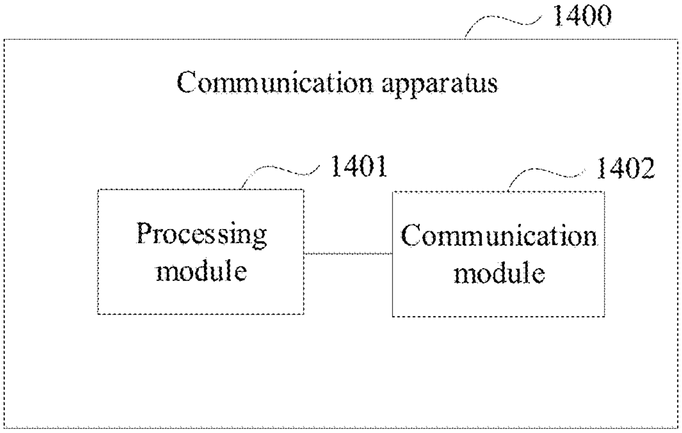
FIG. 14 is a diagram of a structure of a communication apparatus according to this disclosure.

Based on a same concept, as shown in FIG. 14, this disclosure provides a communication apparatus 1400. The communication apparatus 1400 includes a processing module 1401 and a communication module 1402. The communication apparatus 1400 may be an LMF, or may be a communication apparatus that is applied to an LMF or matches an LMF for use and that can implement a communication method performed on an LMF side. Alternatively, the communication apparatus 1400 may be a cell node, or may be a communication apparatus that is applied to a cell node or matches a cell node for use and that can implement a communication method performed on a cell node side. Alternatively, the communication apparatus 1400 may be a terminal device, or may be a communication apparatus that is applied to a terminal device or matches a terminal device for use and that can implement a communication method performed on a terminal device side. Alternatively, the communication apparatus 1400 may be a core network element, or may be a communication apparatus that is applied to a core network element or matches a core network element for use and that can implement a communication method performed on a core network element side.

The communication module may also be referred to as a transceiver module, a transceiver, a transceiver machine, a transceiver apparatus, or the like. The processing module may also be referred to as a processor, a processing board, a processing unit, a processing apparatus, or the like. Optionally, the communication module is configured to perform a sending operation and a receiving operation on the LMF side or the first device side in the foregoing method. A component configured to implement a receiving function in the communication module may be considered as a receiving unit, and a component configured to implement a sending function in the communication module may be considered as a sending unit, that is, the communication module includes the receiving unit and the sending unit.

When the communication apparatus 1400 is used in an LMF, the processing module 1401 may be configured to implement a processing function of the LMF in the embodiment shown in FIG. 9 or FIG. 12, and the communication module 1402 may be configured to implement a receiving and sending function of the LMF in the embodiment shown in FIG. 9 or FIG. 12. Alternatively, the communication apparatus may be understood with reference to the third aspect and the possible designs in the third aspect in the summary.

When the communication apparatus 1400 is used in a core network element or a terminal device, the processing module 1401 may be configured to implement a processing function of the core network element or the terminal device in the embodiment shown in FIG. 9 or FIG. 12, and the communication module 1402 may be configured to implement a receiving and sending function of the core network element or the terminal device in the embodiment in FIG. 9 or FIG. 12. Alternatively, the communication apparatus may be understood with reference to the fourth aspect and the possible designs in the fourth aspect in the summary.

When the communication apparatus 1400 is used in a cell node, the processing module 1401 may be configured to implement a processing function of the cell node in the embodiment shown in FIG. 9 or FIG. 12, and the communication module 1402 may be configured to implement a receiving and sending function of the cell node in the embodiment shown in FIG. 9 or FIG. 12.

In addition, it should be noted that the communication module and/or the processing module may be implemented by using a virtual module. For example, the processing module may be implemented by using a software functional unit or a virtual apparatus, and the communication module may be implemented by using a software function or a virtual apparatus. Alternatively, the processing module or the communication module may be implemented by using an entity apparatus. For example, if the apparatus is implemented by using a chip/chip circuit, the communication module may be an input/output circuit and/or a communication interface, and perform an input operation (corresponding to the foregoing receiving operation) and an output operation (corresponding to the foregoing sending operation). The processing module is an integrated processor, a microprocessor, or an integrated circuit.

Division into the modules in this disclosure is an example, is merely division into logical functions, and may be other division during actual implementation. In addition, functional modules in embodiments of this disclosure may be integrated into one processor, or each of the modules may exist alone physically, or two or more modules may be integrated into one module. The integrated module may be implemented in a form of hardware, or may be implemented in a form of a software functional module.

Based on a same technical concept, this disclosure further provides a communication apparatus 1500. For example, the communication apparatus 1500 may be a chip or a chip system. Optionally, in this disclosure, the chip system may include a chip, or may include a chip and another discrete component.

The communication apparatus 1500 may be configured to implement a function of any network element in the communication system described in the foregoing embodiments. The communication apparatus 1500 may include at least one processor 1510. The processor 1510 is coupled to a memory. Optionally, the memory may be located in the apparatus, the memory may be integrated with the processor, or the memory may be located outside the apparatus. For example, the communication apparatus 1500 may further include at least one memory 1520. The memory 1520 stores a necessary computer program, a computer program, or instructions and/or data for implementing any one of the foregoing embodiments. The processor 1510 may execute the computer program stored in the memory 1520, to complete the method in any one of the foregoing embodiments.

The communication apparatus 1500 may further include a communication interface 1530, and the communication apparatus 1500 may exchange information with another device through the communication interface 1530. For example, the communication interface 1530 may be a transceiver, a circuit, a bus, a module, a pin, or a communication interface of another type. When the communication apparatus 1500 is a chip-type apparatus or circuit, the communication interface 1530 in the apparatus 1500 may also be an input/output circuit, and may input information (or referred to as receiving information) and output information (or referred to as sending information). The processor is an integrated processor, a microprocessor, an integrated circuit, or a logic circuit, and the processor may determine output information based on input information.

The coupling in this disclosure is indirect coupling or a communication connection between apparatuses, units, or modules for information exchange between the apparatuses, the units, or the modules, and may be in electrical, mechanical, or other forms. The processor 1510 may cooperate with the memory 1520 and the communication interface 1530. A specific connection medium between the processor 1510, the memory 1520, and the communication interface 1530 is not limited in this disclosure.

Figure 15:
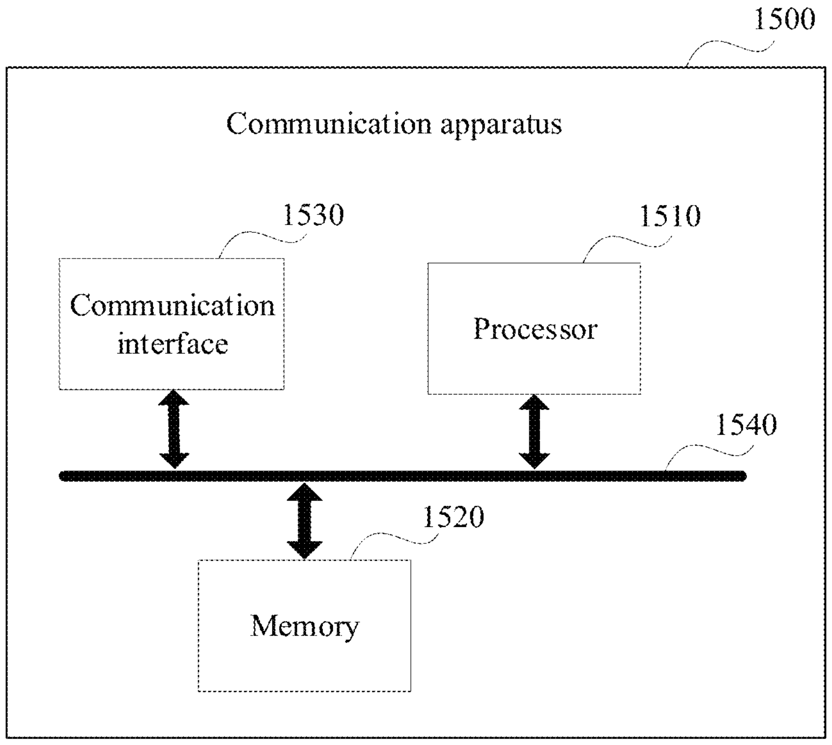
FIG. 15 is a diagram of a structure of a communication apparatus according to this disclosure.

Optionally, as shown in FIG. 15, the processor 1510, the memory 1520, and the communication interface 1530 are connected to each other through a bus 1540. The bus 1540 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 15, but this does not mean that there is only one bus or only one type of bus.

In this disclosure, the processor may be a general-purpose processor, a digital signal processor, an application-specific integrated circuit, a field programmable gate array or another programmable logic device, a discrete gate or transistor logic device, or a discrete hardware component. The processor can implement or execute the methods, the steps, and the logical block diagrams disclosed in this disclosure. The general-purpose processor may be a microprocessor, or may be any conventional processor or the like. The steps of the methods disclosed with reference to this disclosure may be directly implemented by a hardware processor, or may be implemented by a combination of hardware and a software module in a processor.

In this disclosure, the memory may be a nonvolatile memory, for example, a hard disk drive (hard disk drive, HDD) or a solid-state drive (solid-state drive, SSD); or may be a volatile memory (volatile memory), for example, a random-access memory (random-access memory, RAM). The memory is any other medium that can carry or store expected program code in a form of an instruction structure or a data structure and that can be accessed by a computer, but is not limited thereto. The memory in this disclosure may alternatively be a circuit or any other apparatus that can implement a storage function, and is configured to store program instructions and/or data.

In a possible implementation, the communication apparatus 1500 may be used in a terminal device. Specifically, the communication apparatus 1500 may be a terminal device, or may be an apparatus that can support a core network element or a terminal device in implementing a function of the terminal device in any one of the foregoing embodiments. The memory 1520 stores a computer program (or instructions) and/or data for implementing the function of the terminal device in any one of the foregoing embodiments. The processor 1510 may execute the computer program stored in the memory 1520, to complete the method performed by the terminal device in any one of the foregoing embodiments. For a terminal device, the communication interface in the communication apparatus 1500 may be configured to interact with an LMF, and send information to the LMF or receive information from the LMF.

In a possible implementation, the communication apparatus 1500 may be used in a cell node. Specifically, the communication apparatus 1500 may be a cell node, or may be an apparatus that can support a core network element or a cell node in implementing a function of the cell node in any one of the foregoing embodiments. The memory 1520 stores a computer program (or instructions) and/or data for implementing the function of the cell node in any one of the foregoing embodiments. The processor 1510 may execute the computer program stored in the memory 1520, to complete the method performed by the cell node in any one of the foregoing embodiments. For a cell node, the communication interface in the communication apparatus 1500 may be configured to interact with an LMF, and send information to the LMF or receive information from the LMF.

In a possible implementation, the communication apparatus 1500 may be used in a core network element. Specifically, the communication apparatus 1500 may be a core network element, or may be an apparatus that can support a core network element or a core network element in implementing a function of the core network element in any one of the foregoing embodiments. The memory 1520 stores a computer program (or instructions) and/or data for implementing the function of the core network element in any one of the foregoing embodiments. The processor 1510 may execute the computer program stored in the memory 1520, to complete the method performed by the core network element in any one of the foregoing embodiments. For a core network element, the communication interface in the communication apparatus 1500 may be configured to interact with an LMF or a cell node, and send information to the LMF or receive information from the cell node.

In a possible implementation, the communication apparatus 1500 may be used in an LMF. Specifically, the communication apparatus 1500 may be an LMF, or may be an apparatus that can support an LMF in implementing a function of the LMF in any one of the foregoing embodiments. The memory 1520 stores a computer program (or instructions) and/or data for implementing the function of the LMF in any one of the foregoing embodiments. The processor 1510 may execute the computer program stored in the memory 1520, to complete the method performed by the LMF in any one of the foregoing embodiments. For an LMF, the communication interface in the communication apparatus 1500 may be configured to interact with a terminal device, a cell node, a core network element, or the like, for example, send information to the terminal device, the cell node, or the core network element, or receive information from the terminal device, the cell node, or the core network element.

The communication apparatus 1500 provided in this embodiment may be used in a terminal device, a cell node, or a core network element to complete the method performed by the terminal device, the cell node, or the core network element, or may be used in an LMF to complete the method performed by the LMF. Therefore, for technical effects that can be achieved by this embodiment, refer to the foregoing method examples. Details are not described herein again.

Based on the foregoing embodiments, this disclosure provides a communication system, including a terminal device, a cell node, and an LMF. Optionally, a core network element is further included. The terminal device, the cell node or the core network element, and the LMF may implement the communication method provided in the embodiment shown in FIG. 9 or FIG. 12.

Based on the foregoing embodiments, this disclosure further provides a computer program. When the computer program is run on a computer, the computer is caused to perform, from a perspective of a cell node, a terminal device, a core network element, or an LMF, the communication method provided in the embodiment shown in FIG. 9, FIG. 12, or FIG. 13.

Based on the foregoing embodiments, this disclosure further provides a computer-readable storage medium. The computer-readable storage medium stores a computer program. When the computer program is executed by a computer, the computer is caused to perform, from a perspective of a cell node, a terminal device, a core network element, or an LMF, the communication method provided in the embodiment shown in FIG. 9, FIG. 12, or FIG. 13. The storage medium may be any usable medium that can be accessed by the computer. This is used as an example but is not limited to: A computer-readable medium may include a RAM, a read-only memory (read-only memory, ROM), an electrically erasable programmable read-only memory (electrically erasable programmable read-only memory, EEPROM), a CD-ROM or another optical disk storage, a magnetic disk storage medium or another magnetic storage device, or any other medium that can be used to carry or store expected program code in a form of an instruction structure or a data structure and that can be accessed by the computer.

Based on the foregoing embodiments, this disclosure further provides a chip. The chip is configured to read a computer program stored in a memory, and perform, from a perspective of a cell node, a terminal device, a core network element, or an LMF, the communication method provided in the embodiment shown in FIG. 9, FIG. 12, or FIG. 13.

Based on the foregoing embodiments, this disclosure provides a chip system. The chip system includes a processor, configured to support a computer apparatus in implementing functions related to the cell node, the terminal device, the core network element, or the LMF in the embodiment described in FIG. 9, FIG. 12, or FIG. 13. In a possible design, the chip system further includes a memory, and the memory is configured to store a program and data that are necessary for the computer apparatus. The chip system may include a chip, or may include a chip and another discrete component.

All or some of the technical solutions provided in this disclosure may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedure or functions according to this disclosure are all or partially generated. The computer may be a general-purpose computer, a dedicated computer, a computer network, an LMF, a terminal device, a cell node, a core network element, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (digital video disc, DVD)), a semiconductor medium, or the like.

In this disclosure, without a logical contradiction, mutual reference can be made between embodiments. For example, mutual reference can be made between methods and/or terms in method embodiments, mutual reference can be made between functions and/or terms in apparatus embodiments, and mutual reference can be made between functions and/or terms in the apparatus embodiments and the method embodiments.

It is clear that a person skilled in the art can make various modifications and variations to this disclosure without departing from the scope of this disclosure. This disclosure is intended to cover these modifications and variations of this disclosure provided that they fall within the scope of protection defined by the following claims and their equivalent technologies.

What is claimed is:

1. A communication method, comprising:

obtaining M pieces of channel estimation information, wherein an $m^{th}$ piece of channel estimation information in the M pieces of channel estimation information is estimation information of a channel between an $m^{th}$ cell node in M cell nodes and a terminal device, M is a positive integer, and m is a positive integer ranging from 1 to M;

determining a type of a target positioning manner based on the M pieces of channel estimation information; and obtaining N pieces of channel estimation information based on the type of the target positioning manner, wherein the N pieces of channel estimation information are used to position the terminal device, an $n^{th}$ piece of channel estimation information in the N pieces of channel estimation information is estimation information of a channel between an $n^{th}$ cell node in N cell nodes and the terminal device, the N cell nodes are included in the M cell nodes, N is a positive integer less than or equal to M, and n is a positive integer ranging from 1 to N.

2. The method according to claim 1, wherein the determining the type of the target positioning manner based on the M pieces of channel estimation information comprises:

determining a value of a positioning indicator based on the M pieces of channel estimation information; and determining the type of the target positioning manner based on the value of the positioning indicator and a position requirement, wherein the position requirement indicates a value condition that the positioning indicator needs to meet.

3. The method according to claim 2, further comprising:

sending first request information that is used to request the M pieces of channel estimation information, wherein the first request information comprises information indicating the positioning requirement or the positioning indicator.

4. The method according to claim 2, wherein the positioning indicator comprises one or more of the following:

a type of a communication path between the cell node and the terminal device, wherein the type of the communication path comprises a line of sight path or a non-line of sight path; or positioning accuracy corresponding to at least one type of positioning manner.

5. The method according to claim 1, wherein when the type of the target positioning manner corresponds to a first value, the $n^{th}$ piece of channel estimation information in the N pieces of channel estimation information indicates one or more of the following parameters:

a distance between the $n^{th}$ cell node and the terminal device;

a signal transmission delay or a signal transmission delay difference between the $n^{th}$ cell node and the terminal device; or a signal angle of departure or a signal angle of arrival corresponding to the $n^{th}$ cell node.

6. The method according to claim 1, wherein when the type of the target positioning manner corresponds to a second value, the $n^{th}$ piece of channel estimation information in the N pieces of channel estimation information indicates channel information of the channel between the $n^{th}$ cell node and the terminal device.

7. The method according to claim 1, wherein the obtaining N pieces of channel estimation information based on the type of the target positioning manner comprises:

sending second request information that is used to request the N pieces of channel estimation information, wherein the second request information comprises information indicating the type of the target positioning manner; and receiving the N pieces of channel estimation information.

8. The method according to claim 1, further comprising:

positioning the terminal device within a specified time period based on the N pieces of channel estimation information.

9. A communication method, comprising:

sending M pieces of channel estimation information, wherein the M pieces of channel estimation information are used to determine a type of a target positioning manner, an $m^{th}$ piece of channel estimation information in the M pieces of channel estimation information is estimation information of a channel between an $m^{th}$ cell node in M cell nodes and a terminal device, M is a positive integer, and m is a positive integer ranging from 1 to M;

obtaining second request information for requesting N pieces of channel estimation information, wherein the second request information comprises information indicating the type of the target positioning manner; and sending the N pieces of channel estimation information, wherein the N pieces of channel estimation information are used to position the terminal device, an $n^{th}$ piece of channel estimation information in the N pieces of channel estimation information is estimation information of a channel between an $n^{th}$ cell node in N cell nodes and the terminal device, the N cell nodes are included in the M cell nodes, N is a positive integer less than or equal to M, and n is a positive integer ranging from 1 to N.

10. The method according to claim 9, further comprising:

obtaining first request information that is used to request the M pieces of channel estimation information, wherein the first request information comprises information indicating a positioning requirement or a positioning indicator, the positioning requirement indicates a value condition that the positioning indicator needs to meet, and the M pieces of channel estimation information can be used to determine a value of the positioning indicator.

11. The method according to claim 10, wherein the positioning indicator comprises one or more of the following:

a type of a communication path between the cell node and the terminal device, wherein the type of the communication path comprises a line of sight or a non-line of sight; or positioning accuracy corresponding to at least one type of positioning manner.

12. The method according to claim 9, wherein when the type of the target positioning manner corresponds to a first value, the $n^{th}$ piece of channel estimation information in the N pieces of channel estimation information indicates one or more of the following parameters:

a distance between the $n^{th}$ cell node and the terminal device;

a signal transmission delay or a signal transmission delay difference between the $n^{th}$ cell node and the terminal device; or a signal angle of departure or a signal angle of arrival corresponding to the $n^{th}$ cell node.

13. The method according to claim 9, wherein when the type of the target positioning manner corresponds to a second value, the $n^{th}$ piece of channel estimation information in the N pieces of channel estimation information indicates channel information of the channel between the $n^{th}$ cell node and the terminal device.

14. A communication apparatus, comprising:

a processor; and a non-transitory memory storing program instructions that, when executed by the processor, cause the communication apparatus to:

obtain M pieces of channel estimation information, wherein an $m^{th}$ piece of channel estimation information in the M pieces of channel estimation information is estimation information of a channel between an $m^{th}$ cell node in M cell nodes and a terminal device, M is a positive integer, and m is a positive integer ranging from 1 to M;

determine a type of a target positioning manner based on the M pieces of channel estimation information, and obtain N pieces of channel estimation information based on the type of the target positioning manner, wherein the N pieces of channel estimation information are used to position the terminal device, an $n^{th}$ piece of channel estimation information in the N pieces of channel estimation information is estimation information of a channel between an $n^{th}$ cell node in N cell nodes and the terminal device, the N cell nodes are comprised in the M cell nodes, N is a positive integer less than or equal to M, and n is a positive integer ranging from 1 to N.

15. The apparatus according to claim 14, wherein the program instructions, when executed by the processor, further cause the communication apparatus to:

determine a value of a positioning indicator based on the M pieces of channel estimation information; and determine the type of the target positioning manner based on the value of the positioning indicator and a position requirement, wherein the position requirement indicates a value condition that the positioning indicator needs to meet.

16. The apparatus according to claim 15, wherein the program instructions, when executed by the processor, further cause the communication apparatus to send first request information that is used to request the M pieces of channel estimation information, wherein the first request information comprises information indicating the positioning requirement or the positioning indicator.

17. The apparatus according to claim 15, wherein the positioning indicator comprises one or more of the followinging: a type of a communication path between the cell node and the terminal device, wherein the type of the communication path comprises a line of sight or a non-line of sight; or positioning accuracy corresponding to at least one type of positioning manner.

* * * * *